(12) United States Patent
Hai et al.

(10) Patent No.: US 12,475,733 B2
(45) Date of Patent: Nov. 18, 2025

(54) PATTERN RECOGNITION MODULE AND DISPLAY APPARATUS

(71) Applicant: BOE Technology Group Co., Ltd., Beijing (CN)

(72) Inventors: Xiaoquan Hai, Beijing (CN); Xue Dong, Beijing (CN); Guangcai Yuan, Beijing (CN); Xiaochuan Chen, Beijing (CN); Yingzi Wang, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/705,177

(22) PCT Filed: Oct. 29, 2021

(86) PCT No.: PCT/CN2021/127297
§ 371 (c)(1),
(2) Date: Apr. 26, 2024

(87) PCT Pub. No.: WO2023/070498
PCT Pub. Date: May 4, 2023

(65) Prior Publication Data
US 2024/0428609 A1    Dec. 26, 2024

(51) Int. Cl.
*G06V 40/13*    (2022.01)

(52) U.S. Cl.
CPC .................................. *G06V 40/13* (2022.01)

(58) Field of Classification Search
None
See application file for complete search history.

(56) References Cited

U.S. PATENT DOCUMENTS

| 2020/0226342 A1* | 7/2020 | Lin | G06V 40/1318 |
| 2023/0127181 A1* | 4/2023 | Ito | G06V 40/1324 |
| | | | 382/115 |

FOREIGN PATENT DOCUMENTS

| CN | 107480579 A | 12/2017 |
| CN | 111736386 A | 10/2020 |
| CN | 111881873 A | 11/2020 |
| CN | 212031869 A | 11/2020 |
| CN | 112466921 A | 3/2021 |
| CN | 112699761 A | 4/2021 |

(Continued)

OTHER PUBLICATIONS

International Search Report received for PCT Patent Application No. PCT/CN2021/127297, mailed on Jul. 15, 2022, 4 pages (2 pages of English Translation and 2 pages of Original Document).

*Primary Examiner* — Joseph R Haley
(74) *Attorney, Agent, or Firm* — ArentFox Schiff LLP; Michael Fainberg

(57) ABSTRACT

Provided in the present disclosure are a pattern recognition module and a display apparatus. The pattern recognition module includes: a pattern recognition substrate, which includes a base substrate, and a plurality of photosensitive devices arranged in an array and located on one side of the base substrate; and a light constraint layer, which is in direct contact with the side of the pattern recognition substrate that is provided with the plurality of photosensitive devices, and includes at least one diaphragm layer, and a micro-lens layer located on the side of the diaphragm layer that is away from the pattern recognition substrate.

20 Claims, 29 Drawing Sheets

(56) References Cited

FOREIGN PATENT DOCUMENTS

| CN | 113065469 A | 7/2021 |
|---|---|---|
| CN | 113191181 A | 7/2021 |

\* cited by examiner

PATTERN RECOGNITION MODULE AND DISPLAY APPARATUS

CROSS REFERENCE TO RELATED APPLICATIONS

The present disclosure is a US National Stage of International Application No. PCT/CN2021/127297, filed on Oct. 29, 2021, the entire contents of which are incorporated herein by reference.

TECHNICAL FIELD

The present disclosure relates to the field of display technology, and in particular to a print recognition module and a display apparatus.

BACKGROUND

With the rapid development of the information industry, biometric recognition technology has been increasingly widely used. In particular, since different users have different fingerprints, it is easier to confirm user identity. Therefore, the fingerprint recognition technology has been widely applied in multiple fields such as mobile terminals and smart homes, providing security guarantees for user information.

Optical fingerprint recognition is one of the means to achieve fingerprint recognition. The principle of optical fingerprint recognition is as follows: when a finger is placed above the display product, the emitted light from the light source contained in the display product strikes the valleys and ridges of the finger, the emitted light is reflected by the valleys and ridges of the finger, and then enters the photosensitive device included in the display product. Since the reflected light intensities are different at the positions of valleys and ridges, the photosensitive device generates different electrical signals based on the differences in reflected light intensity to realize fingerprint recognition.

SUMMARY

Embodiments of the present disclosure provide a print recognition module and display apparatus. The specific solutions are as follows.

On the one hand, embodiments of the present disclosure provide a print recognition module, including:
a print recognition substrate, where the print recognition substrate includes a base substrate and a plurality of photosensitive devices arranged in an array on a side of the base substrate;
a light restriction layer, arranged in direct contact with a side of the print recognition substrate providing with the plurality of photosensitive devices; where the light restriction layer includes at least one diaphragm layer, and a micro-lens layer on a side of the diaphragm layer facing away from the print recognition substrate;
where the diaphragm layer includes light-transmitting holes arranged in an array;
orthographic projections of the light-transmitting holes on the base substrate are located in orthographic projections of the photosensitive devices on the base substrate;
the micro-lens layer includes a plurality of micro-lenses arranged at intervals; and
orthographic projections of the micro-lenses on the base substrate cover and are larger than the orthographic projections of the light-transmitting holes on the base substrate.

In some embodiments, in the above-mentioned print recognition module provided by embodiments of the present disclosure, the light restriction layer includes at least two diaphragm layers;
the light-transmitting holes in each of the diaphragm layers correspond to each other one-to-one;
orthographic projections of the light-transmitting holes in each of the diaphragm layers on the base substrate are at least partially overlapped with each other.

In some embodiments, in the above-mentioned print recognition module provided by embodiments of the present disclosure, in a direction facing away from the print recognition substrate, the diaphragm layers include a first diaphragm layer, a second diaphragm layer and a third diaphragm layer arranged in sequence;
the first diaphragm layer includes first light-transmitting holes arranged in an array, the second diaphragm layer includes second light-transmitting holes arranged in an array, and the third diaphragm layer includes third light-transmitting holes arranged in an array;
orthographic projections of the second light-transmitting holes on the base substrate cover and are larger than orthographic projections of the first light-transmitting holes on the base substrate; and
the orthographic projections of the second light-transmitting holes on the base substrate are located in orthographic projections of the third light-transmitting holes on the base substrate.

In some embodiments, in the above-mentioned print recognition module provided by embodiments of the present disclosure, between an orthographic projection of a center of the first light-transmitting hole on the base substrate and an orthographic projection of a center of the second light-transmitting hole corresponding the first light-transmitting hole on the base substrate is provided with a first distance;
between the orthographic projection of the center of the first light-transmitting hole on the base substrate and an orthographic projection of a center of the third light-transmitting hole corresponding the first light-transmitting hole on the base substrate is provided with a second distance;
a ratio of the first distance to an aperture of the first light-transmitting hole is greater than or equal to 0 and less than or equal to 20%; and
a ratio of the second distance to the aperture of the first light-transmitting hole is greater than or equal to 0 and less than or equal to 20%.

In some embodiments, in the above-mentioned print recognition module provided by embodiments of the present disclosure, an aperture $D_2$ of the second light-transmitting hole satisfies a following relationship:

$$D_2 = k * D_1,$$
$$D_2 < D_3;$$

where, $1 < k < 2$, $D_1$ represents an aperture of the first light-transmitting hole, and $D_3$ represents an aperture of the third light-transmitting hole.

In some embodiments, in the above-mentioned print recognition module provided by embodiments of the present disclosure, the micro-lenses are arranged in one-to-one correspondence with the light-transmitting holes, and each micro-lens includes a convex surface and a flat surface;

where the convex surface is arranged at a side of the flat surface facing away from the light-transmitting hole.

In some embodiments, in the above-mentioned print recognition module provided by embodiments of the present disclosure, the light restriction layer further includes a plurality of support layers alternately arranged with the diaphragm layers;

the aperture $D_1$ of the first light-transmitting hole satisfies a following relationship:

$$D_1 = [D^2/(2h_s) + h_s] * [n_x/(n-1)] * \tan\theta;$$

where, D represents an aperture of the micro-lens, $h_s$ represents a height of the micro-lens, n represents a refractive index of the micro-lens, $n_x$ represents a refractive index of the support layer, and θ represents a light receiving angle.

In some embodiments, in the above-mentioned print recognition module provided by embodiments of the present disclosure, the plurality of support layers include a first support layer, a second support layer and a third support layer; where, the first support layer is arranged between the first diaphragm layer and the second diaphragm layer;

the second support layer is arranged between the second diaphragm layer and the third diaphragm layer; and the third support layer is arranged on a side of the third diaphragm layer facing away from the second diaphragm layer.

In some embodiments, in the above-mentioned print recognition module provided by embodiments of the present disclosure, the light restriction layer further includes a green resin layer, and the green resin layer is arranged between the first diaphragm layer and the first support layer.

In some embodiments, in the above-mentioned print recognition module provided by embodiments of the present disclosure, the green resin layer fills the first light-transmitting holes, the second support layer fills the second light-transmitting holes, and the third support layer fills the third light-transmitting holes.

In some embodiments, in the above-mentioned print recognition module provided by embodiments of the present disclosure, an aperture $D_3$ of the third light-transmitting hole satisfies a following relationship:

$$D_3 = D * (H - H_3)/H;$$

where, H represents a distance between a surface of the micro-lens layer facing the print recognition substrate and a surface of the first diaphragm layer facing away from the print recognition substrate, and $H_3$ represents a thickness of the third support layer.

In some embodiments, in the above-mentioned print recognition module provided by embodiments of the present disclosure, a thickness of the second diaphragm layer is substantially the same as a thickness of the third diaphragm layer;

the distance H between the surface of the micro-lens layer facing the print recognition substrate and the surface of the first diaphragm layer facing away from the print recognition substrate satisfies a following relationship:

$$H = \{[D^2/(4h_s)] * [n_x/(n-1)]\} - \{(3n-2)*n_x*h_s/[2(n^2-n)]\};$$

$$H = H_1 + H_2 + H_3 + H_4 + 2h;$$

where, $H_1$ represents a thickness of the first support layer, $H_2$ represents a thickness of the second support layer, $H_4$ represents a thickness of the green resin layer, h represents a thickness of the second diaphragm layer and a thickness of the third diaphragm layer.

In some embodiments, in the above-mentioned print recognition module provided by embodiments of the present disclosure, the thickness $H_1$ of the first support layer satisfies a following relationship:

$$H_1 = D_2 * (H - H_3)/D_3 - H_4.$$

In some embodiments, in the above-mentioned print recognition module provided by embodiments of the present disclosure, 1.4≤$n_x$≤1.7, 1.5≤n≤2.0, 1°≤θ≤10°, 2 μm≤D≤50 μm, 1 μm≤$D_1$≤10 μm, 1 μm<$D_2$<40 μm, 2 μm≤$D_3$≤50 μm, 1 μm≤$h_s$≤20 μm, 1 μm≤$H_1$≤20 μm, 1 μm≤$H_2$≤20 μm, 1 μm≤$H_3$<20 μm, 0.5 μm≤$H_4$≤3 μm, 0.5 μm≤h≤1.5 μm, 4.5 μm≤H≤100 μm.

In some embodiments, in the above-mentioned print recognition module provided by embodiments of the present disclosure, a material of the support layer includes transparent resin and/or green resin.

In some embodiments, in the above-mentioned print recognition module provided by embodiments of the present disclosure, a material of the first diaphragm layer includes metal, and both a material of the second diaphragm layer and a material of the third diaphragm layer include black resin.

In some embodiments, in the above-mentioned print recognition module provided by embodiments of the present disclosure, a distance between adjacent micro-lenses is greater than 0 μm and less than or equal to 2 μm.

In some embodiments, in the above-mentioned print recognition module provided by embodiments of the present disclosure, a shape of an orthographic projection of the micro-lens on the base substrate is a rounded square, a circle, a right-angled square or a hexagon.

In some embodiments, in the above-mentioned print recognition module provided by embodiments of the present disclosure, the print recognition substrate further includes a plurality of pixel driving circuits;

a layer where the plurality of pixel driving circuits are located is arranged between a layer where the plurality of photosensitive devices are located and the base substrate; and the plurality of pixel driving circuits and the plurality of photosensitive devices are electrically connected in a one-to-one correspondence.

In some embodiments, in the above-mentioned print recognition module provided by embodiments of the present disclosure, each of the plurality of photosensitive devices includes at least one sub-photosensitive device;

each sub-photosensitive device includes a first electrode, a photoelectric conversion layer and a second electrode arranged in a stacked manner;

in the same one photosensitive device which includes a plurality of sub-photosensitive devices, each first electrode is electrically connected with a corresponding pixel driving circuit, each second electrode is arranged independently of each other, and each photoelectric conversion layer is arranged independently of each other.

In some embodiments, in the above-mentioned print recognition module provided by embodiments of the present disclosure, the print recognition substrate further includes a plurality of connection electrodes, and the plurality of connection electrodes are arranged on a same layer as the first electrode;
- each first electrode in the same one photosensitive device is electrically connected with the corresponding pixel driving circuit through the plurality of connection electrodes.

In some embodiments, in the above-mentioned print recognition module provided by embodiments of the present disclosure, each photosensitive device includes four sub-photosensitive devices; and In the same one photosensitive device, the four sub-photosensitive devices are arranged in two rows and two columns.

In some embodiments, in the above-mentioned print recognition module provided by embodiments of the present disclosure, the plurality of connection electrodes include a plurality of first connection electrodes; where
- four first electrodes in one of the photosensitive devices are electrically connected with the corresponding pixel driving circuit through a same first connection electrode; and
- an orthographic projection of the first connection electrode on the base substrate and orthographic projections of the four first electrodes electrically connected with the first connection electrode on the base substrate overlap each other.

In some embodiments, in the above-mentioned print recognition module provided by embodiments of the present disclosure, the plurality of connection electrodes further include a plurality of second connection electrodes;
- each second connection electrode is electrically connected with two adjacent first electrodes in the same photosensitive device; and
- an orthographic projection of the second connection electrode on the base substrate and orthographic projections of the two adjacent first electrodes electrically connected with the second connection electrode on the base substrate overlap each other.

In some embodiments, in the above-mentioned print recognition module provided by embodiments of the present disclosure, one photoelectric conversion layer corresponds to at least one of the plurality of micro-lenses.

In some embodiments, in the above-mentioned print recognition module provided by embodiments of the present disclosure, the photoelectric conversion layers are in one-to-one correspondence with the plurality of micro-lenses; and
- an orthographic projection of the photoelectric conversion layer on the base substrate is located in an orthographic projection of the micro-lens corresponding to the photoelectric conversion layer on the base substrate.

In some embodiments, in the above-mentioned print recognition module provided by embodiments of the present disclosure, the micro-lenses are in one-to-one correspondence with the light-transmitting holes;
- an orthographic projection of the light-transmitting hole on the base substrate is located in a central area of the orthographic projection of the photoelectric conversion layer corresponding to the light-transmitting hole on the base substrate; and
- an orthographic projection of a center of the photoelectric conversion layer on the base substrate substantially coincides with an orthographic projection of a center of the light-transmitting hole on the base substrate.

In some embodiments, in the above-mentioned print recognition module provided by embodiments of the present disclosure, the print recognition substrate further includes a planarization layer, an insulating layer and a transparent bias layer;
- where the planarization layer, the insulating layer and the transparent bias layer are located in sequence on a side of a layer where the plurality of photosensitive devices are located facing away from the base substrate;
- the planarization layer includes a plurality of first via holes, the first via holes are arranged in one-to-one correspondence with the second electrodes;
- an orthographic projection of the first via hole on the base substrate is located in an orthographic projection of the second electrode corresponding to the first via hole on the base substrate;
- the insulating layer includes a plurality of second via holes; the second via holes and the first via holes penetrate through each other in one-to-one correspondence; and
- an orthographic projection of the second via hole on the base substrate is located in the orthographic projection of the first via hole corresponding to the second via hole on the base substrate; and
- the second electrode is electrically connected with the transparent bias layer through the first via hole and the second via hole penetrating through with each other.

In some embodiments, in the above-mentioned print recognition module provided by embodiments of the present disclosure, an orthographic projection of the first via hole on the photoelectric conversion layer and an orthographic projection of the second via hole on the photoelectric conversion layer are both located in a central area of the photoelectric conversion layer;
- an orthographic projection of a center of the first via hole on the photoelectric conversion layer and an orthographic projection of a center of the second via hole on the photoelectric conversion layer both substantially coincide with a center of the photoelectric conversion layer.

In some embodiments, in the above-mentioned print recognition module provided by embodiments of the present disclosure, the print recognition substrate includes a print recognition area, and a noise reduction area located on at least one side of the print recognition area;
- the plurality of photosensitive devices, the light-transmitting holes, the first via holes and the second via holes are located in the print recognition area, and the plurality of micro-lenses are located in the print recognition area and the noise reduction area;
- the print recognition substrate further includes a capacitor located in the noise reduction area; the capacitor includes a first electrode plate and a second electrode plate that are opposite to each other; where the first electrode plate and the first electrode are located on a same layer and made of a same material; and the second electrode plate and the second electrode are located on a same layer and made of a same material;
- the planarization layer further includes a plurality of third via holes located in the noise reduction area;
- an orthographic projection of the third via hole on the base substrate is located in an orthographic projection of the first electrode plate on the base substrate;

the third via holes are filled with the insulating layer to insulate the first electrode plate from the second electrode plate;

an area of one of the plurality of third via holes is approximately the same as a sum of areas of the first via holes in an area where one of the plurality of photosensitive devices is located.

In some embodiments, in the above-mentioned print recognition module provided by embodiments of the present disclosure, the print recognition substrate further includes a barrier layer and an electromagnetic shielding layer;

where the barrier layer is arranged between the transparent bias layer and the light restriction layer, and the electromagnetic shielding layer is arranged between the barrier layer and the light restriction layer.

In some embodiments, in the above-mentioned print recognition module provided by embodiments of the present disclosure, the pixel driving circuit includes: a reset transistor, an amplification transistor and a read transistor;

where at least one of the reset transistor, the amplification transistor and the read transistor is a double-gate transistor.

In some embodiments, in the above-mentioned print recognition module provided by embodiments of the present disclosure, the pixel driving circuit further includes a noise reduction transistor; and the noise reduction transistor is a single-gate transistor or a double-gate transistor.

On the other hand, embodiments of the present disclosure provide a display apparatus, including: a display module, a fingerprint recognition module and an adhesive layer;

where the fingerprint recognition module is the above-mentioned print recognition module provided by embodiments of the present disclosure, the fingerprint recognition module is arranged on an opposite side of a display side of the display module;

the adhesive layer is arranged between the display module and the fingerprint recognition module; and an orthographic projection of the adhesive layer on the display modules is located in a frame area of the display module.

DETAILED DESCRIPTION

Figure 1:
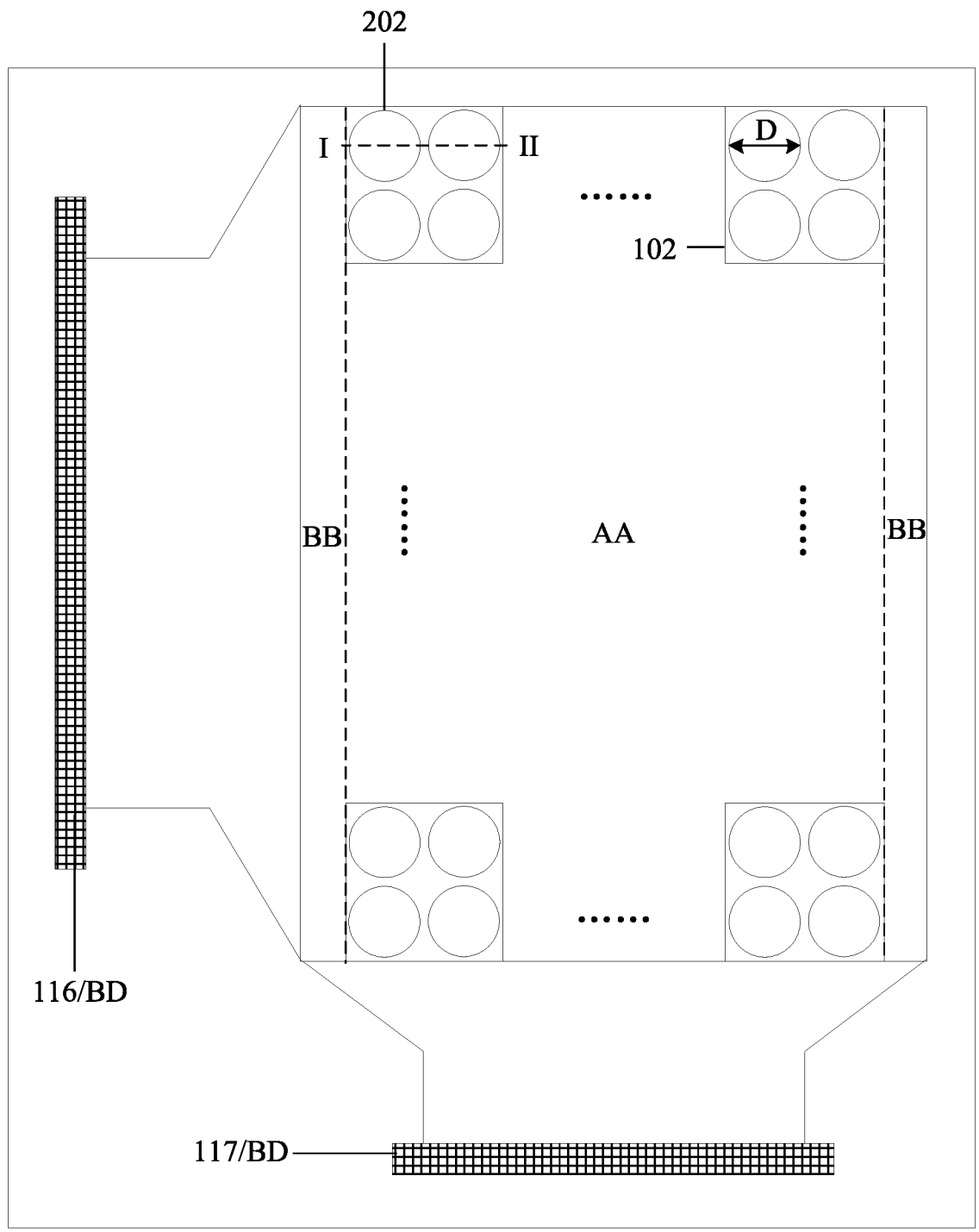
FIG. 1 is a schematic structural diagram of a print recognition module provided by an embodiment of the present disclosure.

In order to make the purpose, technical solutions and advantages of the embodiments of the present disclosure more clear, the technical solutions of the embodiments of the present disclosure will be clearly and completely described below in conjunction with the drawings of the embodiments of the present disclosure. It should be noted that the sizes and shapes of the figures in the drawings do not reflect true proportions and are only intended to illustrate the present disclosure. And the same or similar reference numbers throughout represent the same or similar elements or elements with the same or similar functions.

Unless otherwise defined, technical terms or scientific terms used in the present disclosure should have ordinary meanings as understood by those of ordinary skill in the art to which the present disclosure belongs. "First", "second" and similar words used in the present disclosure and the claims do not indicate any order, quantity or importance, but are only used to distinguish different components. Words such as "include" or "comprise" mean that the elements or objects before the word include elements or objects after the word and their equivalents, without excluding other elements or objects. "Inside", "outside", "up", "down", etc., are only used to express relative positional relationships. When the absolute position of the described object changes, the relative positional relationship may also change accordingly.

In the related art, part of film layers in a print recognition substrate are reused as diaphragm layers of a collimation film, and micro-lenses are formed on the collimation film to effectively reduce three pain points in a lamination structure (including the collimation film and micro lens) bonding scheme (i.e. the collimation structure directly adheres to a surface of the print recognition substrate): large angle crosstalk, diagonal/moiré stripes on film materials, and poor reliability (NG), thereby improving the accuracy of identified fingerprint information in an optical fingerprint recognition process. However, due to the need to reuse part of the film layers in the print recognition substrate with the diaphragm layers, it is necessary to change the production process of the film layers in the print recognition substrate that are reused as the diaphragm layers in the related art, which increases the difficulty of production and is not conducive to mass production.

In order to solve at least the above technical problems existing in the related art, embodiments of the present disclosure provide a print recognition module for identifying fingerprints, palm-prints and other prints. The present disclosure takes fingerprint recognition as an example for explanation. Specifically, as shown in FIGS. 1 to 5, the print recognition module provided by the embodiments of the present disclosure includes:

a print recognition substrate 100, where the print recognition substrate 100 comprises a base substrate 101 and a plurality of photosensitive devices 102 arranged in an array on a side of the base substrate 101; optionally, the base substrate 101 may be a flexible base substrate, such as polyimide (PI) substrate; alternatively, the base substrate 101 may also be a rigid substrate, such as a glass substrate;

a light restriction layer 200, arranged in direct contact with a side of the print recognition substrate 100 providing with the plurality of photosensitive devices 102; where the light restriction layer 200 includes at least one diaphragm layer 201 (for example, including a first diaphragm layer 211, a second diaphragm layer 212 and a third diaphragm layer 213), and a micro-lens layer (including a micro-lens(es) 202) on a side of the diaphragm layer 201 facing away from the print recognition substrate 100; where the diaphragm layer 201 can be made of light-absorbing or low-reflectivity materials, such as black matrix (BM) material, molybdenum oxide, aluminum oxide or chromium metal, etc. The diaphragm layer includes light-transmitting holes (for example, including a first light-transmitting hole a, a second light-transmitting hole b and a third light-transmitting hole c) arranged in an array; an orthographic projection of the light-transmitting hole on the base substrate 101 is located in an orthographic projection of the photosensitive device 102 on the base substrate 101; the micro-lens layer includes a plurality of micro-lenses 202 arranged at intervals; and an orthographic projection of the micro-lens 202 on the base substrate 101 cover and is larger than an orthographic projection of the light-transmitting hole on the base substrate 101.

In the above-mentioned print recognition module provided by embodiments of the present disclosure, the light restriction layer 200 is directly integrated on the surface of the print recognition substrate 100, so that there is no need to change the relevant manufacturing process of the print recognition substrate 100, which facilitates mass production. Moreover, since the light restriction layer 200 is in direct contact with the side of the print recognition substrate 100 that has the plurality of photosensitive devices 102 instead of being attached to the surface of the print recognition substrate 100, it can effectively reduce the large angle crosstalk, diagonal/moiré stripes on the film materials, poor reliability and other adverse effects of the alignment structure scheme in related art, thereby improving the accuracy of the identified fingerprint information in the optical fingerprint recognition process.

Figure 5:
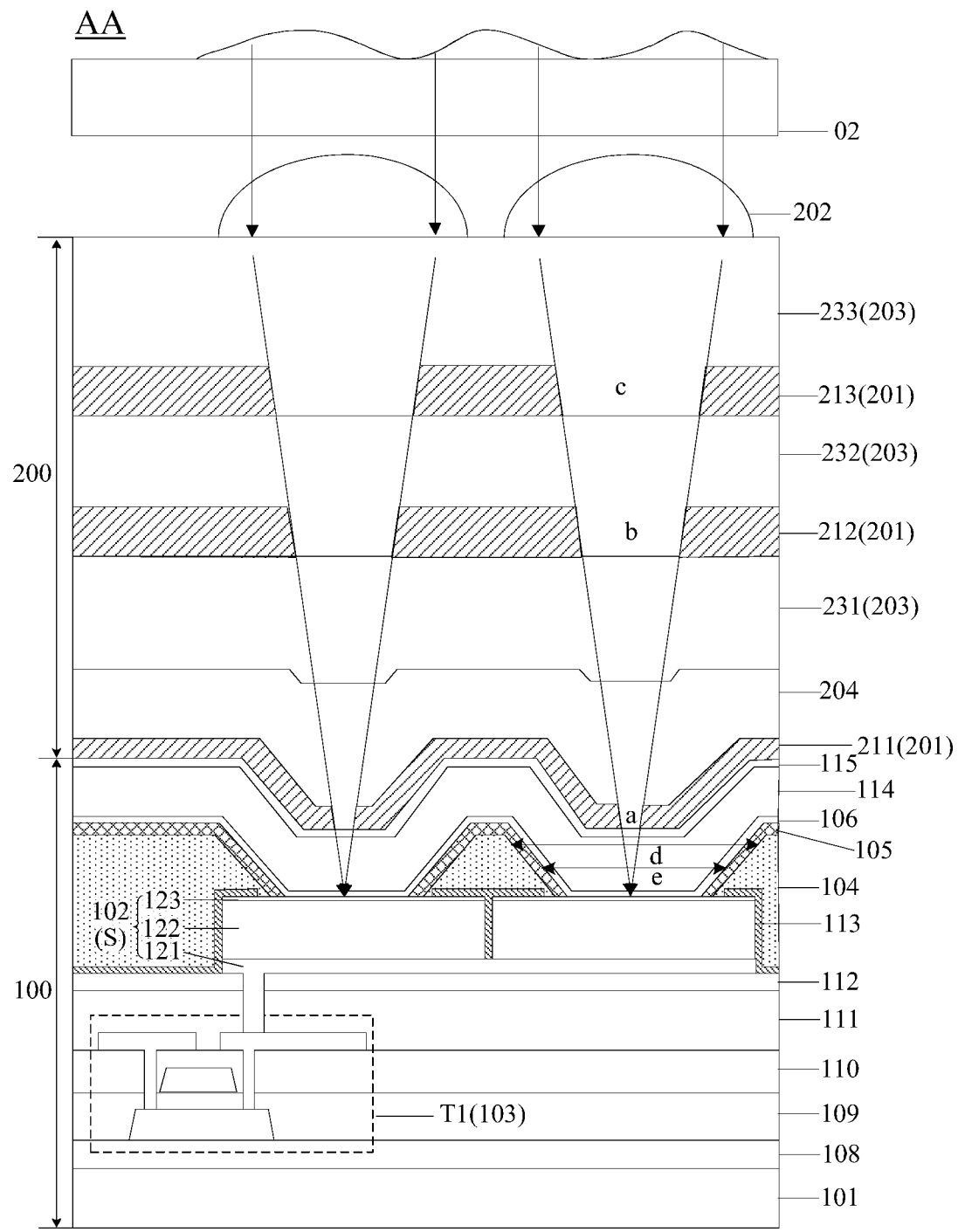
FIG. 5 is a cross-sectional view along line I-II in FIG. 1, FIG. 2, FIG. 3 or FIG. 4.

In some embodiments, in the above-mentioned print recognition module provided by embodiments of the present disclosure, as shown in FIG. 5, the light restriction layer 200 may include at least two diaphragm layers 201, and light-transmitting holes in each diaphragm layer 201 correspond to each other one-to-one, and orthographic projections of the light-transmitting holes in each diaphragm layer 201 on the base substrate 100 are at least partially overlapped with each other, so as to achieve a collimation effect on light through the mutual cooperation of each diaphragm layer 201.

In some embodiments, in the above-mentioned print recognition module provided by embodiments of the present disclosure, as shown in FIG. 5, in a direction Y facing away from the print recognition substrate 100, the diaphragm layers 201 may include the first diaphragms layer 211, the second diaphragm layer 212 and the third diaphragm layer 213 arranged in sequence. Here, the first diaphragm layer 211 includes first light-transmitting holes a arranged in an array, the second diaphragm layer 212 includes second light-transmitting holes b arranged in an array, and the third diaphragm layer 213 includes third light-transmitting holes c arranged in an array. An orthographic projections of the second light-transmitting hole b on the base substrate 101 covers and is larger than an orthographic projection of the first light-transmitting hole a on the base substrate 101; and the orthographic projection of the second light-transmitting hole b on the base substrate 101 is located within an orthographic projection of the third light-transmitting hole c on the base substrate 101.

Figure 8:
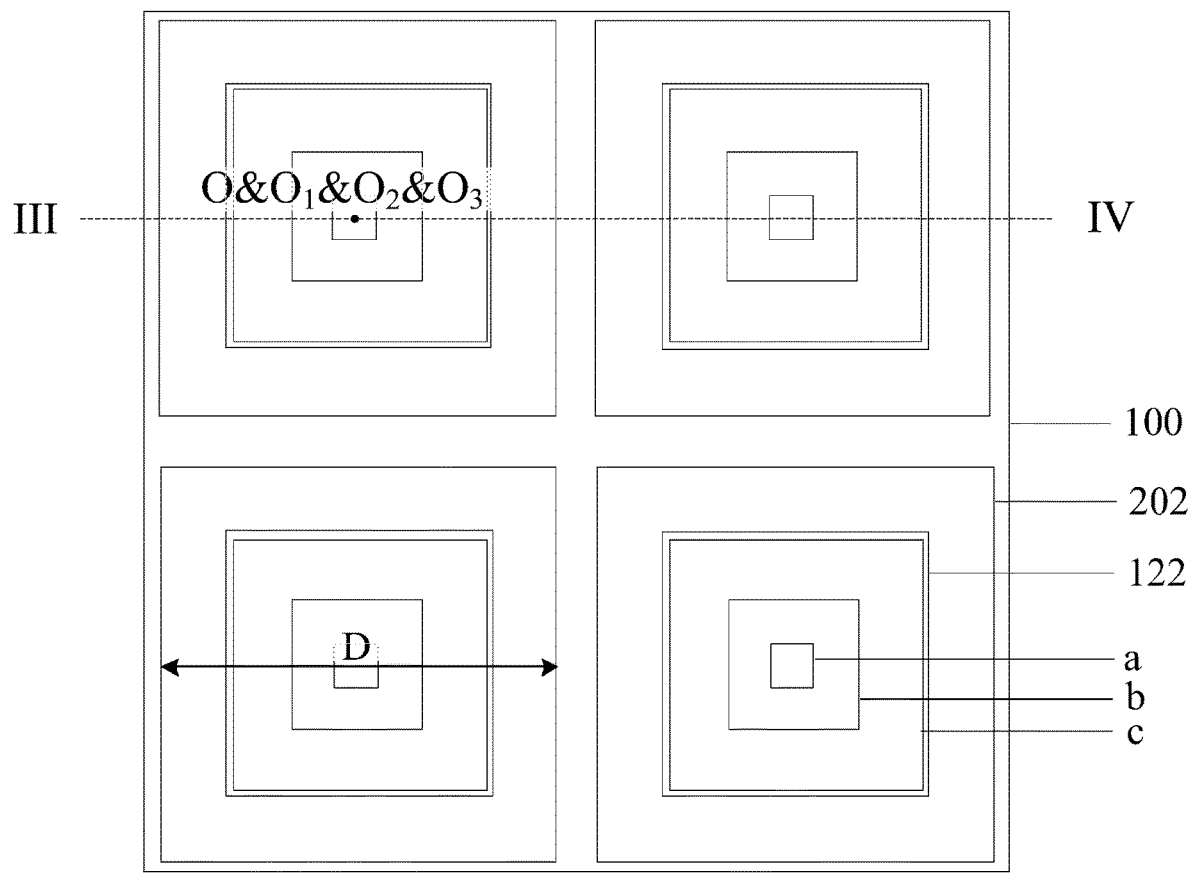
FIG. 8 is another matching schematic diagram of a light restriction layer and a photosensitive device provided by an embodiment of the present disclosure.
Figure 9:
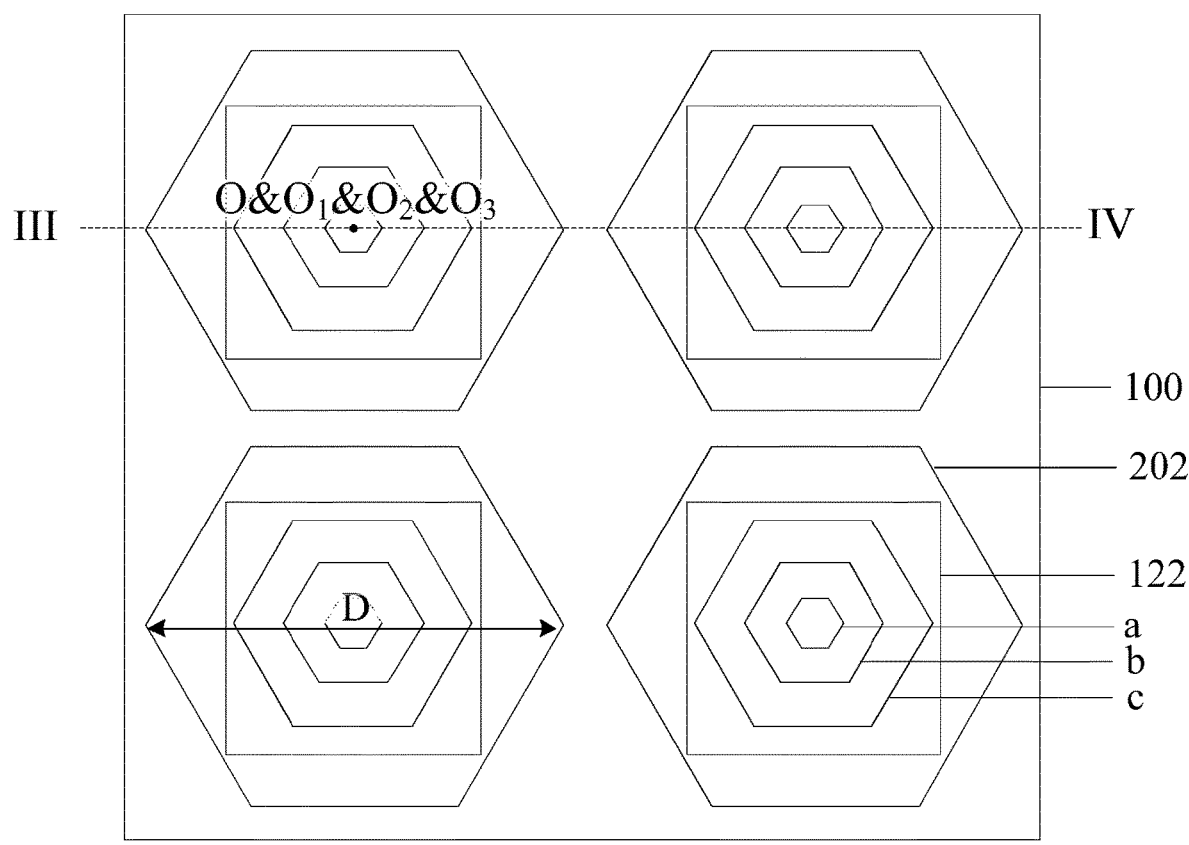
FIG. 9 is another matching schematic diagram of a light restriction layer and a photosensitive device provided by an embodiment of the present disclosure.
Figure 10:
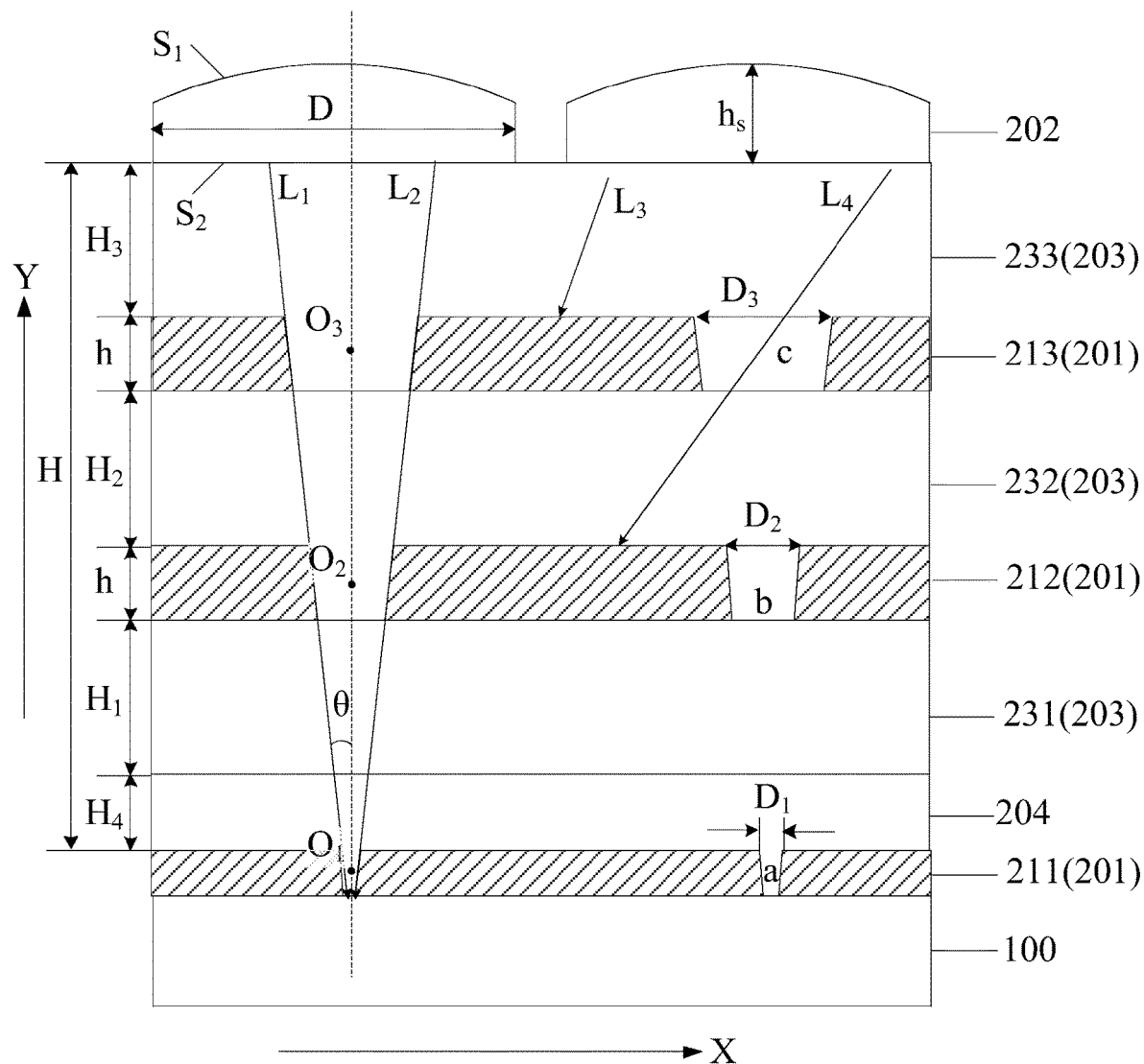
FIG. 10 is a cross-sectional view along line III-IV in FIG. 6, FIG. 7, FIG. 8 or FIG. 9.

In some embodiments, in the above-mentioned print recognition module provided by embodiments of the present disclosure, as shown in FIGS. 6 to 10, between an orthographic projection of a center $O_1$ of a first light-transmitting hole a on the base substrate 101 and an orthographic projection of a center $O_2$ of a second light-transmitting hole b corresponding the first light-transmitting hole on the base substrate 101 is provided with a first distance (that is, the distance between $O_1$ and $O_2$ staggered along the X direction in FIG. 10); between an orthographic projection of a center $O_1$ of a first light-transmitting hole a on the base substrate 101 and an orthographic projection of a center $O_3$ of a third light-transmitting hole c corresponding the first light-transmitting hole on the base substrate 101 is provided with a second distance (that is, the distance between $O_1$ and $O_3$ staggered along the X direction in FIG. 10); a ratio of the first distance to an aperture $D_1$ of the first light-transmitting hole a is greater than or equal to 0 and less than or equal to 20%; and a ratio of the second distance to the aperture $D_1$ of the first light-transmitting hole a is greater than or equal to 0 and less than or equal to 20%. Specifically, FIGS. 6 to 10 show that the center $O_1$ of the first light-transmitting hole a, the center $O_2$ of the second light-transmitting hole b, and the center $O_3$ of the third light-transmitting hole c are located on the same straight line (shown as a dotted line in FIG. 10), it is equivalent to the above-mentioned first distance and second distance being both 0.

It should be understood that in an ideal state, the center $O_1$ of the first light-transmitting hole a, the center $O_2$ of the second light-transmitting hole b, and the center $O_3$ of the third light-transmitting hole c are located on the same straight line, and the collimation effect is the best. However, due to factors such as alignment during the actual production process, the centers of the three may deviate slightly. Within the above deviation range from 0 to 20%, the overlapping first light-transmitting hole a, the second light-transmitting hole b and the third light-transmitting hole c can still have excellent collimation effect.

The abscissa represents a light receiving angle of the light restriction layer 200, and the ordinate represents the transmittance (T) of the light-transmitting hole contained in the light restriction layer 200. The curve under this coordinate system is called the light receiving angle curve. Here, the full width at half maximum (FWHM) of the light receiving angle curve is a core index representing the light restriction layer 200. Usually, in order to meet the requirements of fingerprint recognition, the FWHM is required to be within 7°, and the area enclosed by the light receiving angle curve and the abscissa is the amount of fingerprint signals received by the photosensitive device 102. The higher the amount of fingerprint signals is, the greater the recognition accuracy is, so it is usually required that, when the FWHM is fixed, the center transmittance of the light-transmitting hole (equivalent to the peak of the light receiving angle curve) is as high as possible.

In view of this, in the above-mentioned print recognition module provided by embodiments of the present disclosure, as shown in FIGS. 6 to 10, the aperture $D_2$ of the second light-transmitting hole b satisfies the following relationship:

$$D_2 = k * D_1; \quad (1)$$

$$D_2 < D_3; \quad (2)$$

where, $1<k<2$, $D_1$ represents an aperture of the first light-transmitting hole, and $D_3$ represents an aperture of the third light-transmitting hole.

As shown in FIG. 10, the third light-transmitting hole c can transmit all the light in the range from $L_1$ to $L_2$, and each of the second light-transmitting hole b and the first light-transmitting hole a has an aperture that can exactly transmit all the light in the range from $L_1$ to $L_2$. Under the condition that the apertures of the first light-transmitting hole a, the second light-transmitting hole b and the third light-transmitting hole c satisfy the above-mentioned relational expressions (1) and (2), all the light in the range from $L_1$ to $L_2$ passing through the third light-transmitting hole c is illuminated on the photosensitive device 102 through the second light-transmitting hole b and the first light-transmitting hole a in sequence, thereby maximizing the central transmittance of the light-transmitting hole, improving the amount of fingerprint signals received by the photosensitive device 102 and enhancing the accuracy of fingerprint recognition. In addition, as shown in FIG. 10, under the condition that the apertures of the first light-transmitting hole a, the second light-transmitting hole b and the third light-transmitting hole c satisfy the above-mentioned relational expressions (1) and (2), it can also effectively prevent crosstalk caused by stray light $L_3$ and $L_4$.

It should be noted that, in theory, a hole wall of the light-transmitting hole is perpendicular to the base substrate 101. In this case, the aperture uniformity of the light-transmitting hole is better. However, due to the influence of the manufacturing process, the hole wall of the light-transmitting hole may not be perpendicular to the base substrate 101, form a certain slope relative to the base substrate 101 (as shown in FIG. 10). At this time, the aperture of the light-transmitting hole gradually increases in the direction Y facing away from the base substrate 101. In the present disclosure, the aperture of the light-transmitting hole may refer to the maximum value of the aperture.

In some embodiments, in the above-mentioned print recognition module provided by embodiments of the present disclosure, as shown in FIG. 10, the micro-lenses 202 are arranged in one-to-one correspondence with the light-transmitting holes (including the first light-transmitting hole a, the second light-transmitting hole b and the second light-transmitting hole c arranged in a stacked manner); the micro-lens 202 includes a convex surface S1 and a flat surface S2. The convex surface S1 is arranged at a side of the flat surface S2 facing away from the light-transmitting hole, so that the micro-lens 202 can effectively concentrate the reflected light of fingerprints to the corresponding position of the light-transmitting hole.

In some embodiments, in the above-mentioned print recognition module provided by the embodiment of the present disclosure, as shown in FIG. 10, the light restriction layer 200 may further include a plurality of support layers 203 alternately arranged with the diaphragm layers 201; in order to make all the light in the range from $L_1$ to $L_2$ passing through the third light-transmitting hole c illuminate on the photosensitive device 102 through the second light-transmitting hole b and the first light-transmitting hole a in sequence, the aperture $D_1$ of the first light-transmitting hole a can satisfy the following relationship:

$$D_1 = [D^2/(2h_s) + h_s] * [n_x/(n-1)] * \tan\theta; \quad (3)$$

where, D represents an aperture of the micro-lens 202, $h_s$ represents a height of the micro-lens 202, n represents a refractive index of the micro-lens 202, $n_x$ represents a refractive index of the support layer 203, and $\theta$ represents a light receiving angle.

In some embodiments, in the above-mentioned print recognition module provided by embodiments of the present disclosure, as shown in FIG. 10, the support layers 203 may include a first support layer 231, a second support layer 232, and a third support layer 233; where, the first support layer 231 is arranged between the first diaphragm layer 211 and the second diaphragm layer 212, the second support layer 232 is arranged between the second diaphragm layer 212 and the third diaphragm layer 213, and the third support layer 233 arranged on a side of the third diaphragm layer 213 facing away from the second diaphragm layer 212. Optionally, the first support layer 231 fills the first light-transmitting hole a, the second support layer 232 fills the second light-transmitting hole b, and the third support layer 233 fills the third light-transmitting hole c.

In some embodiments, in the above-mentioned print recognition module provided by embodiments of the present disclosure, as shown in FIG. 10, the light restriction layer 200 may further include a green resin layer 204. The green resin layer 204 is arranged between the first diaphragm layer 211 and the first support layers 231. Since light above 600 nm in ambient light can shine onto the light restriction layer 200 through the finger, it will then be received by the photosensitive device 102 and interfere with the fingerprint recognition effect. The green resin layer 204 can intercept light above 600 nm, thus disposing the green resin layer 204 between the first diaphragm layer 211 and the first support layer 231 can effectively avoid interference from the ambient light, improving the fingerprint recognition effect. In addition, the green resin layer 204 is provided between the first diaphragm layer 211 and the first support layer 231, which is beneficial for maintaining the process stability in related art when producing the first support layer 231, the second diaphragm layer 212, the second support layer 232, the third diaphragm layer 213, the third support layer 233 and the micro-lens layer arranged alternately.

In some embodiments, in the above-mentioned print recognition substrate 100 provided by embodiments of the present disclosure, the material of the support layer 203 (including the first support layer 231, the second support layer 232 and the third support layer 233) may include transparent resin (OC) and/or green resin (G-Resin). It is easy to understand that when at least one of the first support layer 231, the second support layer 232 and the third support layer 233 is made of green resin, the filtering of ambient light above 600 nm can be achieved. In this case, the green resin layer 204 may not be provided, in which case the first support layer 231 fills the first light-transmitting hole a. Of course, the green resin layer 204 may also be provided to further intercept ambient light above 600 nm. When the first support layer 231, the second support layer 232 and the third support layer 233 are all made of transparent resin, in order to effectively filter out ambient light above 600 nm, the green resin layer 204 needs to be provided.

In some embodiments, in the above-mentioned print recognition module provided by embodiments of the present disclosure, as shown in FIG. 10, the aperture $D_3$ of the third light-transmitting hole c satisfies the following relationship:

$$D_3 = D * (H - H_3)/H; \quad (4)$$

where, H represents a distance between a surface of the micro-lens layer facing the print recognition substrate 100 and a surface of the first diaphragm layer 211 facing away from the print recognition substrate 100, and $H_3$ represents a thickness of the third support layer 233.

When the aperture $D_3$ of the third light-transmitting hole c satisfies the above relational expression (4), the aperture $D_3$ of the third light-transmitting hole c can be set according to the distance H between the surface of the micro-lens layer (including micro-lens 202) facing the print recognition substrate 100 and the surface of the first diaphragm layer 211 facing away from the print recognition substrate 100, the aperture D of micro-lens 202, and the thickness $H_1$ of the third support layer 233, so that the fingerprint reflected light collected by the micro-lens 202 can almost all converge to the position of the third light-transmitting hole c, and then illuminate on the photosensitive device 102 through the third light-transmitting hole c, the second light-transmitting hole b and the first light-transmitting hole a in sequence, thereby increasing the central transmittance, improving the amount of fingerprint signals received by the photosensitive device 102, and improving the accuracy of fingerprint recognition.

In some embodiments, in the above-mentioned print recognition module provided by embodiments of the present disclosure, the thickness of the second diaphragm layer 212 is substantially same as the thickness of the third diaphragm layer 213, that is, the difference in thickness between the two may be zero, it can also be within the error range caused by measurement, manufacturing process and equipment, etc., for example, the difference in thickness between the two is less than 0.2 μm. The distance H between the surface of the micro-lens layer (including the micro-lens 202) facing the print recognition substrate 100 and the surface of the first diaphragm layer 211 facing away from the print recognition substrate 100 satisfies the following relationship:

$$H = \{[D^2/(4h_s)] * [n_x/(n-1)]\} - \{(3n - 2) * n_x * h_s/[2(n^2 - n)]\}; \quad (5)$$

$$H = H_1 + H_2 + H_3 + H_4 + 2h; \quad (6)$$

where, $H_1$ represents a thickness of the first support layer 231, $H_2$ represents a thickness of the second support layer 232, $H_4$ represents a thickness of the green resin layer 204, and h represents a thickness of the second diaphragm layer 212 and a thickness of the third diaphragm layer 213.

In some embodiments, a value of the distance H between the surface of the micro-lens layer (including the micro-lens 202) facing the print recognition substrate 100 and the surface of the first diaphragm layer 211 facing away from the print recognition substrate 100 can be set according to the above relational expression (5). And then, the thickness $H_4$ of the green resin layer 204, the thickness $H_1$ of the first support layer 231, the thickness $H_2$ of the second support layer 232, the thickness $H_3$ of the third support layer 233, the thickness h of the second diaphragm layer 212 and the thickness h of the third diaphragm layer 213 are reasonably designed to achieve both the effects of improving the center transmittance and preventing crosstalk.

In some embodiments, in the above-mentioned print recognition module provided by embodiments of the present disclosure, as shown in FIG. 10, the thickness $H_1$ of the first support layer 231 satisfies the following relationship:

$$H_1 = D_2 * (H - H_3)/D_3 - H_4. \quad (7)$$

Under the condition that the thickness $H_1$ of the first support layer 231 satisfies the relationship (7), the light receiving angle θ can be ensured to be small, which is beneficial for improving the accuracy of fingerprint recognition.

In some embodiments, in the above-mentioned print recognition module provided by embodiments of the present disclosure, in order to make the central transmittance higher and still achieve the target FWHM, the value range of each of the above parameters can be respectively: $1.4 \leq n_x \leq 1.7$, $1.5 \leq n \leq 2.0$, $1° \leq θ \leq 10°$, $2 \text{ μm} \leq D \leq 50 \text{ μm}$, $1 \text{ μm} \leq D_1 \leq 10 \text{ μm}$, 1

μm<$D_2$<40 μm, 2 μm≤$D_3$≤50 μm, 1 μm≤$h_s$≤20 μm, 1 μm≤$H_1$≤20 μm, 1 μm≤$H_2$≤20 μm, 1 μm≤$H_3$<20 μm, 0.5 μm≤$H_4$≤3 μm, 0.5 μm≤h≤1.5 μm, 4.5 μm≤H≤100 μm.

Due to the limitations of existing manufacturing processes and equipment for micro-lenses 202, there is a constant lens space between adjacent micro-lenses 202. For example, the distance between adjacent micro-lenses 202 is greater than 0 μm and less than or equal to 2 μm. Therefore, when the micro-lens 202 matches the print recognition substrate 100 with different resolutions (Pixels per inch, PPI), the size (Pitch) of the photosensitive device 102 in the print recognition substrate 100 with a small resolution is relatively larger, and the corresponding size of the micro-lens 202 matched with the photosensitive device 102 is relatively larger; the size of the photosensitive device 102 in the print recognition substrate 100 with high resolution is relatively smaller, and the size of the micro-lens 202 matched with the photosensitive device 102 is relatively smaller. And compared with the micro-lens 202 of smaller size, the micro-lens 202 of larger size can converge more fingerprint reflected light onto the matched photosensitive device 102. As a result, the amount of fingerprint signals received by the photosensitive device 102 in the print recognition substrate 100 with high resolution is smaller than the amount of fingerprint signals received by the photosensitive device 102 in the print recognition substrate 100 with small resolution. When the requirement of FWHM within 7° is met, the central transmittance of the light-transmitting hole in the print recognition substrate 100 with high resolution will be smaller than the central transmittance of the light-transmitting hole in the print recognition substrate 100 with small resolution.

In view of this, in the above-mentioned print recognition module provided by embodiments of the present disclosure, as shown in FIGS. 1 to 4 and FIGS. 6 to 9, a shape of an orthographic projection of the micro-lens 202 on the base substrate is a rounded square or a circle. It can be seen from FIGS. 1 to 4 and FIGS. 6 to 9, when the aperture D of the micro-lens 202 is the same, the area of the right-angled square, the area of the rounded square, the area of the circle and the area of the hexagon decrease in sequence. Therefore, compared with the hexagonal and circular micro-lenses 202, the right-angled square and rounded square micro-lenses 202 can concentrate more fingerprint reflected light onto the photosensitive device 102 below the micro-lenses 202, thereby improving the central transmittance. Therefore, when the resolution of the print recognition substrate 100 is larger resulting in the smaller central transmittance, the micro-lens 202 of a right-angled square or a rounded square can be used to improve the central transmittance. When the resolution of the print recognition substrate 100 is smaller and the central transmittance is larger, a hexagonal or circular micro-lens 202 can be used, at this time, the central transmittance is almost unchanged; of course, the right-angled square or rounded square micro-lens 202 can also be used to further improve the central transmittance. Of course, in specific implementations, a shape of the orthographic projection of the micro-lens 202 on the base substrate 101 can also be flexibly set according to actual needs, and is not limited here.

Figure 6:
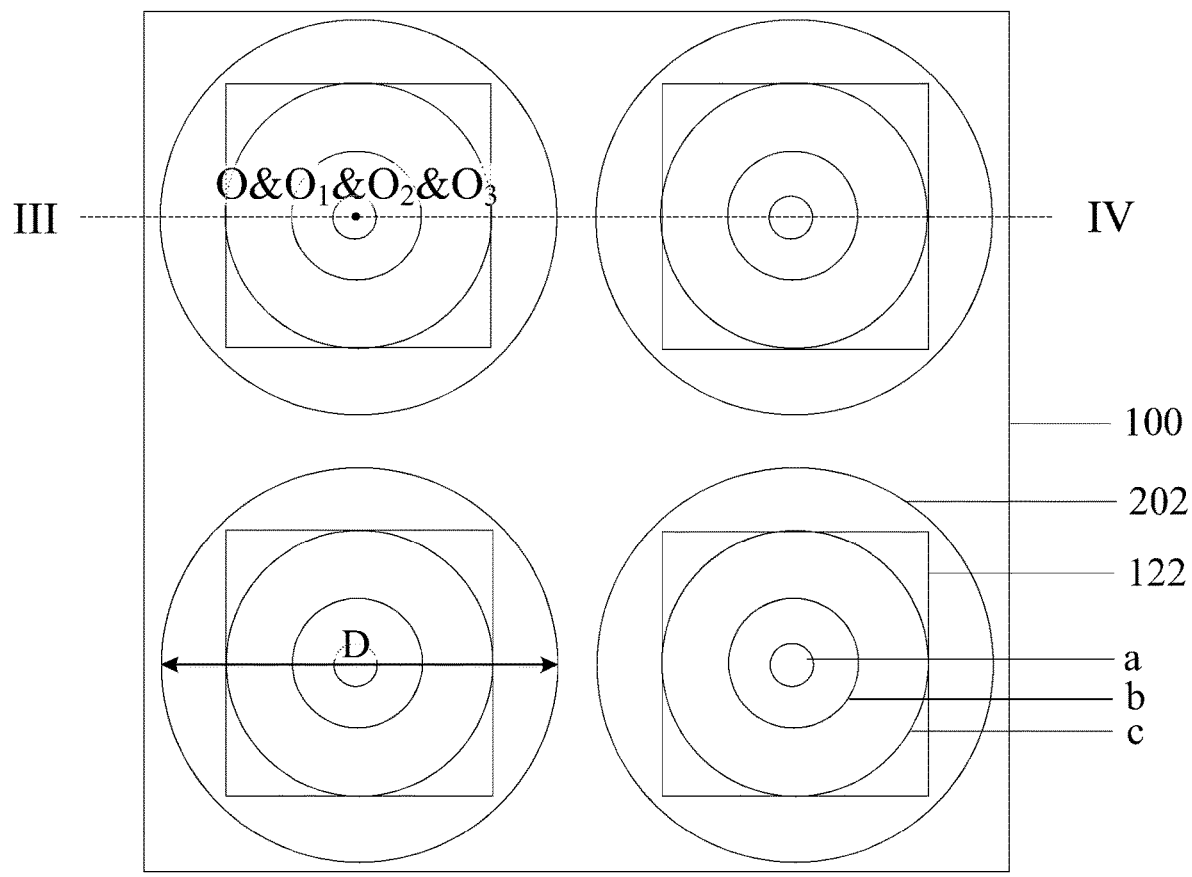
FIG. 6 is a matching schematic diagram of a light restriction layer and a photosensitive device provided by an embodiment of the present disclosure.
Figure 7:
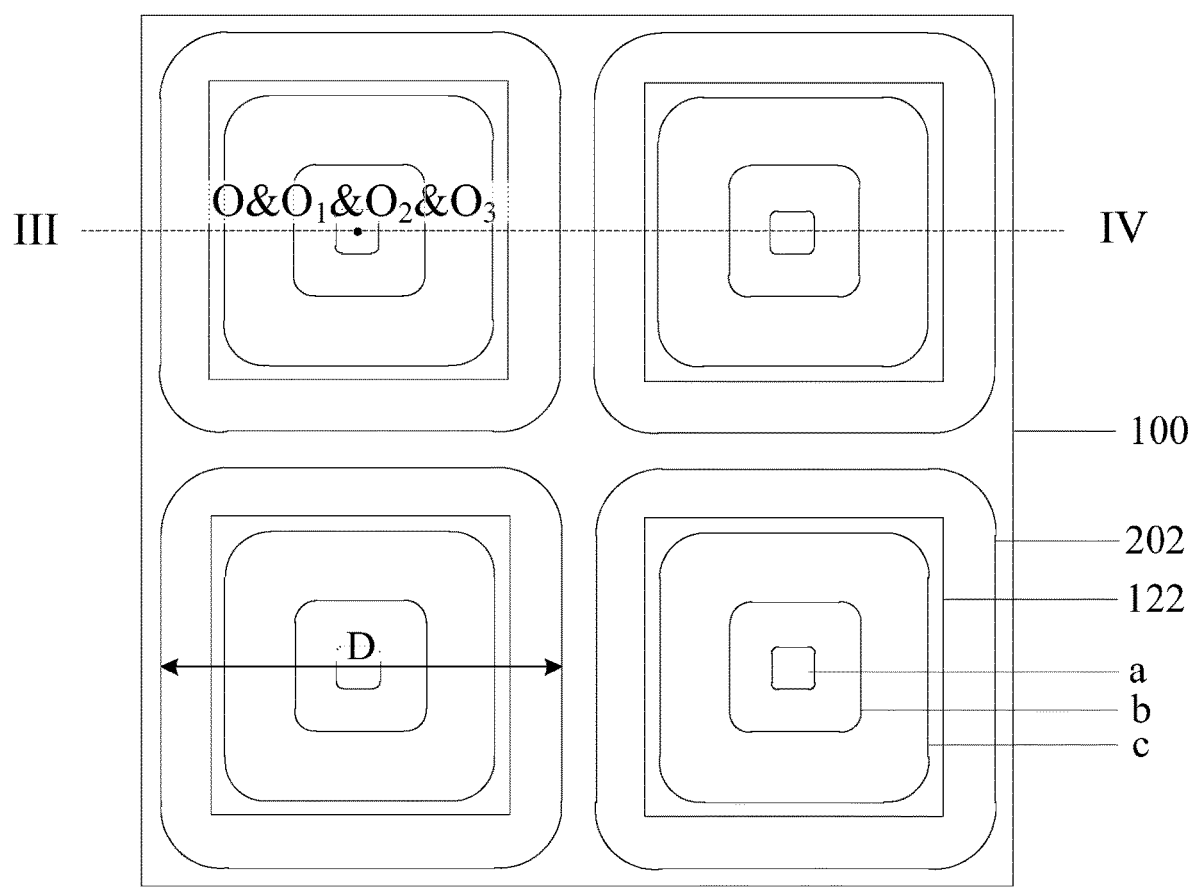
FIG. 7 is another matching schematic diagram of a light restriction layer and a photosensitive device provided by an embodiment of the present disclosure.

In some embodiments, one micro-lens 202 can be arranged corresponding to a set of light-transmitting holes (for example, a first light-transmitting hole a, a second light-transmitting hole b, and a third light-transmitting hole c of which orthographic projections are overlapped) where orthographic projections of the set of light-transmitting holes overlap with each other, and when a shape of the orthographic projection of the micro-lens 202 is circle, the corresponding set of light-transmitting holes are all circular holes, as shown in FIG. 6; when a shape of the orthographic projection of the micro-lens 202 is the rounded square, right-angled square, or hexagon, the corresponding set of light-transmitting holes can be correspondingly rounded square holes (as shown in FIG. 7), right-angled square holes (as shown in FIG. 8), or hexagonal holes (as shown in FIG. 9); or the corresponding set of light-transmitting holes can also be circular holes as shown in FIG. 6, which are not limited here.

Figure 11:
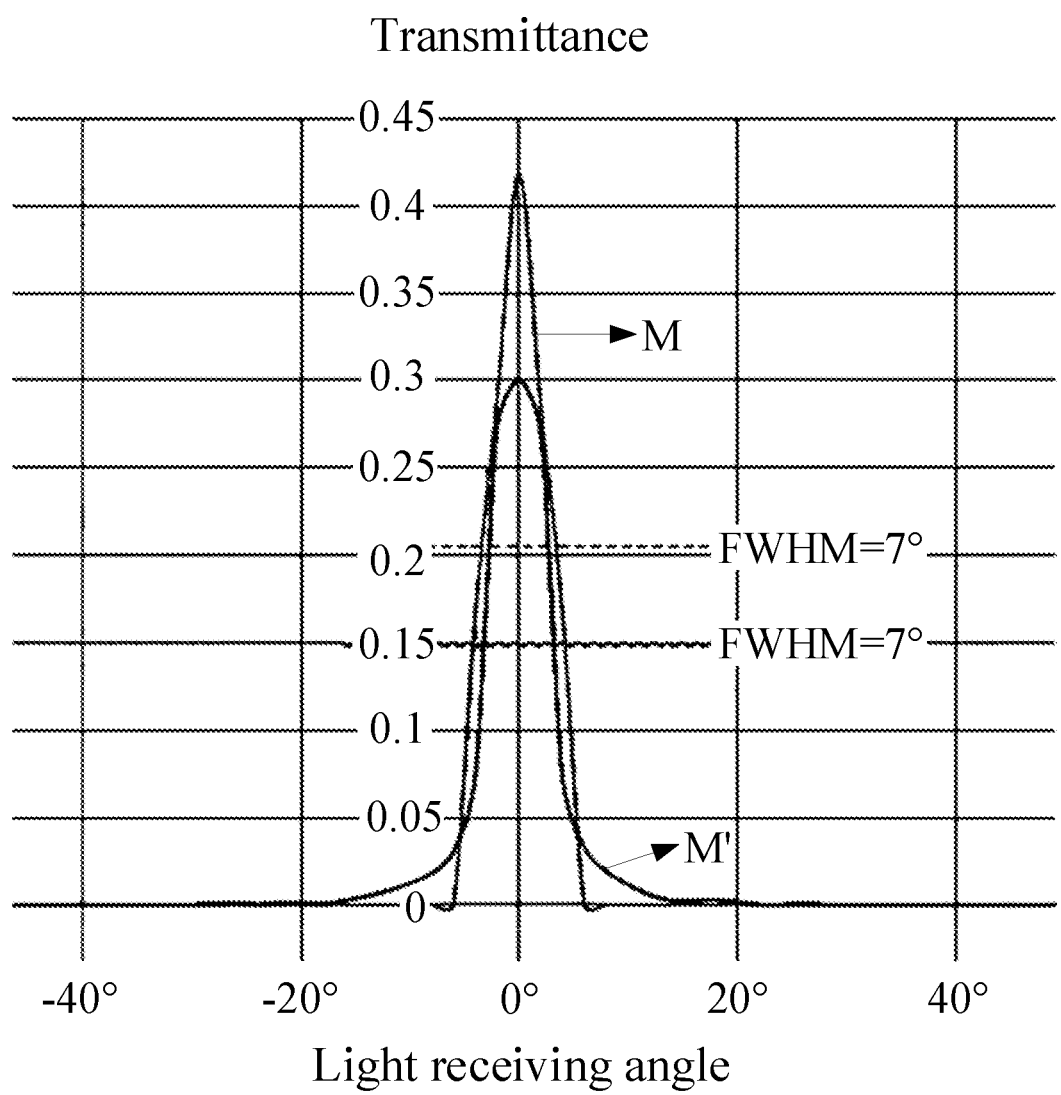
FIG. 11 is a curve diagram which shows the light receiving angle curve of the print recognition module provided by the embodiment of the present disclosure and the light receiving angle curve of the print recognition module in the related art.

FIG. 11 shows a light receiving angle curve M when the above parameters are adopted and the micro-lens 202 is the rounded square, as well as a light receiving angle curve M' of the related art where part of film layers of the print recognition substrate 100 is multiplexed as diaphragm layers 201. As can be seen from FIG. 11, when the FWHM of both curves is 7°, the center transmittance of the present disclosure is 42%, and the center transmittance of the related art is 30%. Therefore, compared with the related art, the center transmittance of the present disclosure increases by 12%, which is conducive to improving the accuracy of fingerprint recognition.

In some embodiments, in the above-mentioned print recognition module provided by embodiments of the present disclosure, as shown in FIG. 5, the print recognition substrate 100 may further include a plurality of pixel driving circuits 103, and a layer where the plurality of pixel driving circuits 103 are located is arranged between a layer where the plurality of photosensitive devices 102 are located and the base substrate 101; the plurality of pixel driving circuits 103 and the plurality of photosensitive devices 102 are electrically connected in one-to-one correspondence, so as to realize the independent driving of the photosensitive device 102 by the pixel driving circuit 103.

In some embodiments, the pixel driving circuit 102 may be in a passive pixel sensor (PPS) mode or an active pixel sensor (APS) mode. Here, the APS mode is a pixel design scheme that improves image quality and reduces noise interference. The pixel driving circuit 102 of the APS mode amplifies electrical signals provided by the photosensitive device 102 that is easily affected by noise, so as to minimize the impact of external readout noise sources related to external chip (IC) amplifiers and minimize the influence of impedance, it can be prepared on a large area.

Figure 12:
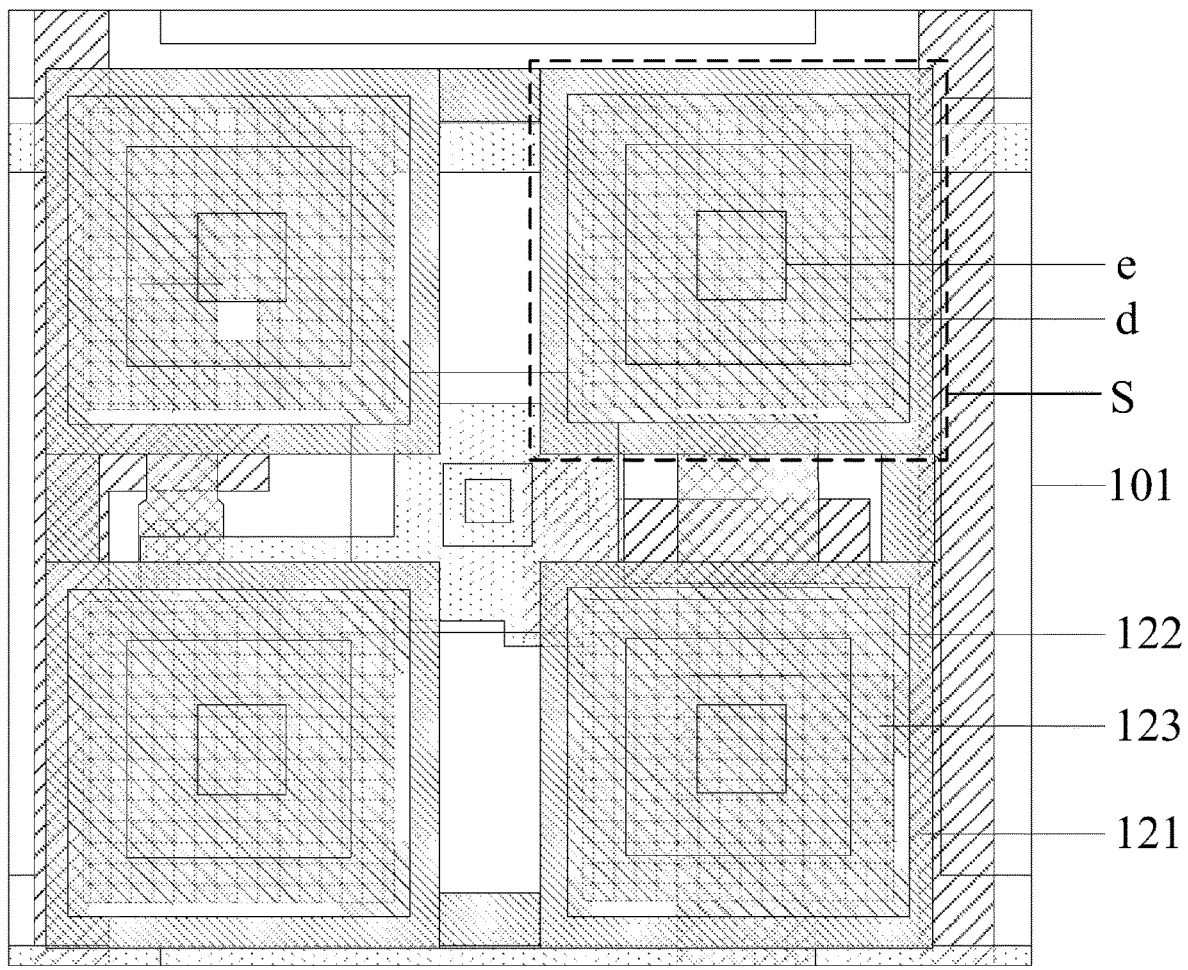
FIG. 12 is a design layout of an area where a photosensitive device is located in the print recognition area of the print recognition module provided by an embodiment of the present disclosure.
Figure 13:
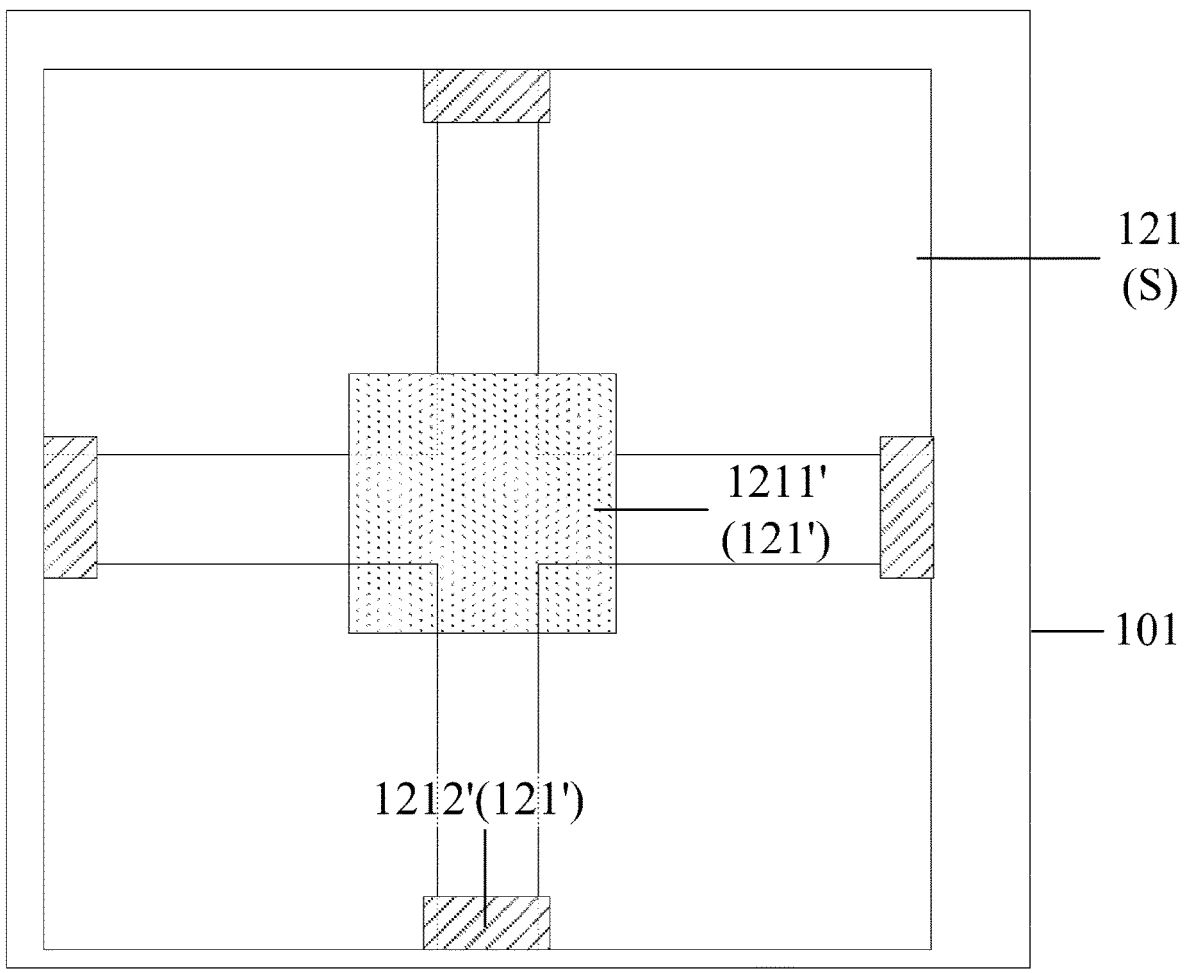
FIG. 13 is a schematic structural diagram of a layer where a first electrode is located in FIG. 12.
Figure 14:
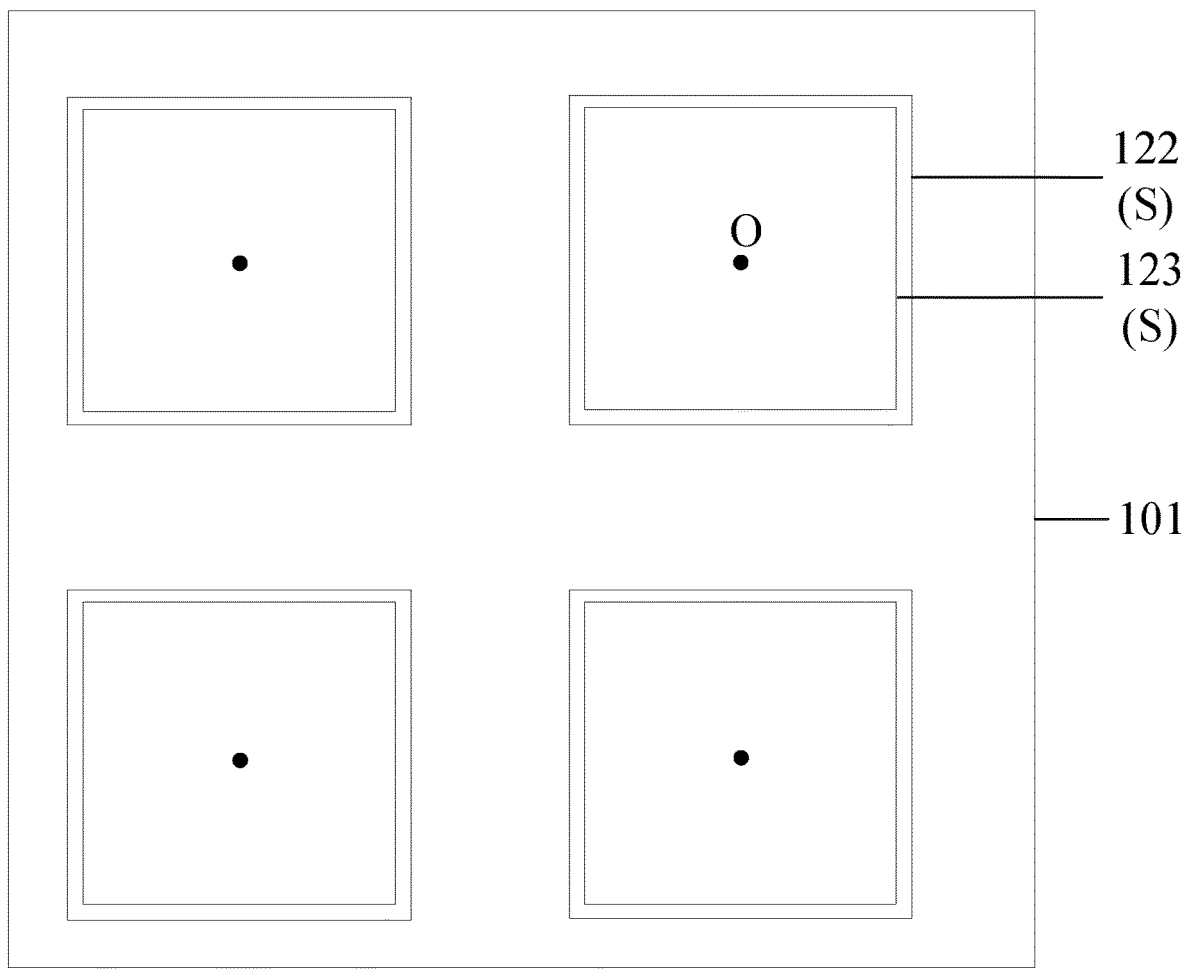
FIG. 14 is a schematic structural diagram of a photoelectric conversion layer and a layer where the second electrode is located in FIG. 12.

In some embodiments, in the above-mentioned print recognition module provided by embodiments of the present disclosure, as shown in FIGS. 12 to 14, in order to improve the pixel filling rate, each photosensitive device 102 may include at least one sub-photosensitive device S; each sub-photosensitive device S includes a first electrode 121, a photoelectric conversion layer 122 and a second electrode 123 arranged in a stacked manner; in the same one photosensitive device 102 which includes a plurality of sub-photosensitive devices S, the first electrodes 121 are electrically connected with a corresponding pixel driving circuit 103, the second electrodes 123 are arranged independently of each other, and the photoelectric conversion layers 122 are arranged independently of each other.

In some embodiments, in the above-mentioned print recognition module provided by embodiments of the present disclosure, as shown in FIGS. 12 to 14, the print recognition substrate 100 may further include a plurality of connection electrodes 121', and the plurality of connection electrodes 121' are arranged on a same layer as the first electrodes 121; the first electrodes 121 in the same one photosensitive device 102 are electrically connected with the corresponding pixel driving circuit 103 through the connection electrodes 121'.

In some embodiments, in the above-mentioned print recognition module provided by embodiments of the present disclosure, as shown in FIGS. 12 to 14, in order to improve the pixel filling rate, each photosensitive device 102 can include four sub-photosensitive devices S, and in the same one photosensitive device 102, the four sub-photosensitive devices S are arranged in two rows and two columns.

In some embodiments, in the above-mentioned print recognition module provided by embodiments of the present disclosure, as shown in FIGS. 12 to 14, the plurality of connection electrodes 121' may include a plurality of first connection electrodes 1211', where four first electrodes 121 in one of the photosensitive devices 102 are electrically connected with the pixel driving circuit 103 corresponding to the one photosensitive device through a same first connection electrode 1211'; and an orthographic projection of the first connection electrode 1211' on the base substrate and orthographic projections of the four first electrodes 121 electrically connected with the first connection electrode on the base substrate 101 overlap each other, which is equivalent to the first connection electrode 1211' being located in the central area of the photosensitive device 102.

In some embodiments, in the above-mentioned print recognition module provided by embodiments of the present disclosure, as shown in FIGS. 12 to 14, the plurality of connection electrodes 121' may further include a plurality of second connection electrodes 1212', each second connection electrode 1212' is electrically connected with two adjacent first electrodes 121 in a same photosensitive device 102, and an orthographic projection of the second connection electrode 1212' on the base substrate 101 and orthographic projections of the two adjacent first electrodes 121 electrically connected with the second connection electrode 1212' on the base substrate 101 overlap each other, which is equivalent to the second connection electrode 1212' extending from a gap between the two adjacent first electrodes 121 to an edge area of the first electrode 121. The second connection electrode 1212' can reduce the overall resistance value of the first electrode 121 in the same photosensitive device 102.

It should be noted that in the present disclosure, the first connection electrode 1211' is located in a central area of the photosensitive device 102, so it is convenient to connect the pixel driving circuit 103 and the photosensitive device 103 through the first connection electrode 1211'. In some embodiments, the second connection electrode 1212' can also be used to connect the pixel driving circuit 103 and the photosensitive device 102, which is not limited here.

In some embodiments, in the above-mentioned print recognition module provided by embodiments of the present disclosure, as shown in FIGS. 6 to 9, the photoelectric conversion layers 122 are in one-to-one correspondence with the micro-lenses 202, and an orthographic projection of the photoelectric conversion layer 122 on the base substrate 101 is located in an orthographic projection of the micro-lens 202 corresponding to the photoelectric conversion layer on the base substrate 101, so that fingerprint reflected light collected by the micro-lens 202 is all absorbed by the corresponding photoelectric conversion layer 122, thereby increasing the signal volume and increasing the signal-to-noise ratio. Of course, in specific implementations, one photoelectric conversion layer 122 can also be provided corresponding to at least two micro-lenses 202, which is not limited here.

In some embodiments, in the above-mentioned print recognition substrate provided by embodiments of the present disclosure, as shown in FIGS. 6 to 9, the orthographic projections of the light-transmitting holes (for example, including the first light-transmitting hole a, the second light-transmitting hole b, and the third light-transmitting hole c of which orthographic projections are overlapped) on the base substrate 101 are located in a central area (that is, the area close to the center O of the photoelectric conversion layer 122) of the orthographic projection of the photoelectric conversion layer 122 corresponding to the light-transmitting holes on the base substrate 101. And, an orthographic projection of a center O of the photoelectric conversion layer 122 on the base substrate 101 substantially coincides with an orthographic projection of a center of the light-transmitting hole (for example, including the center $O_1$ of the first light-transmitting hole a, the center $O_2$ of the second light-transmitting hole b, and the center $O_3$ of the third light-transmitting hole c, of which orthographic projections are overlapped) on the base substrate 101.

It should be noted that in the embodiments provided by the present disclosure, due to limitations of process conditions or the influence of other factors such as measurement, "substantially coincide" may coincide exactly, or there may be some deviation (for example, a deviation of ±0.6 μm), therefore the relationship of "substantially coincide" between relevant features, as long as it meets the allowable error, it falls within the protection scope of the present disclosure.

In some embodiments, the photoelectric conversion layer 122 provided by the embodiments of the present disclosure may include a P-type semiconductor layer, an I-type semiconductor layer (also called an intrinsic semiconductor layer), and an N-type semiconductor layer arranged in a stacked manner. And, a single mask patterning process can be used to form the photoelectric conversion layer 122 and the second electrode 123. Optionally, as shown in FIG. 14, in order to reduce the leakage current, the orthographic projection of the second electrode 123 on the base substrate 101 needs to be slightly smaller than the orthographic projection of the photoelectric conversion layer 122 on the base substrate 101. For example, the distance between a boundary of the orthographic projection of the second electrode 123 on the base substrate 101 and a boundary of the orthographic projection of the photoelectric conversion layer 122 on the base substrate 101 may range from 0.5 μm to 2 μm.

Figure 15:
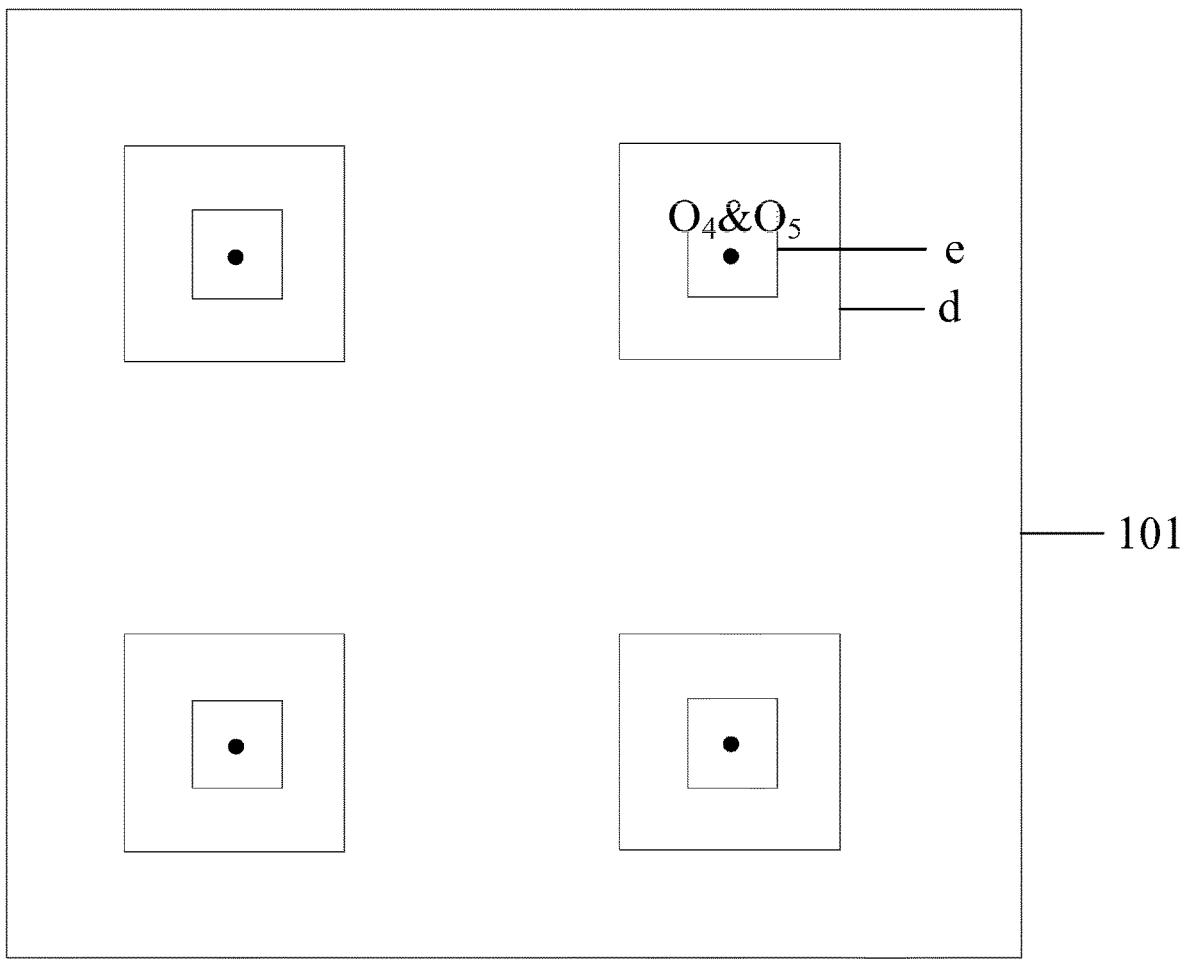
FIG. 15 is a schematic structural diagram of a first planarization layer and a first insulating layer in FIG. 12.
Figure 16:
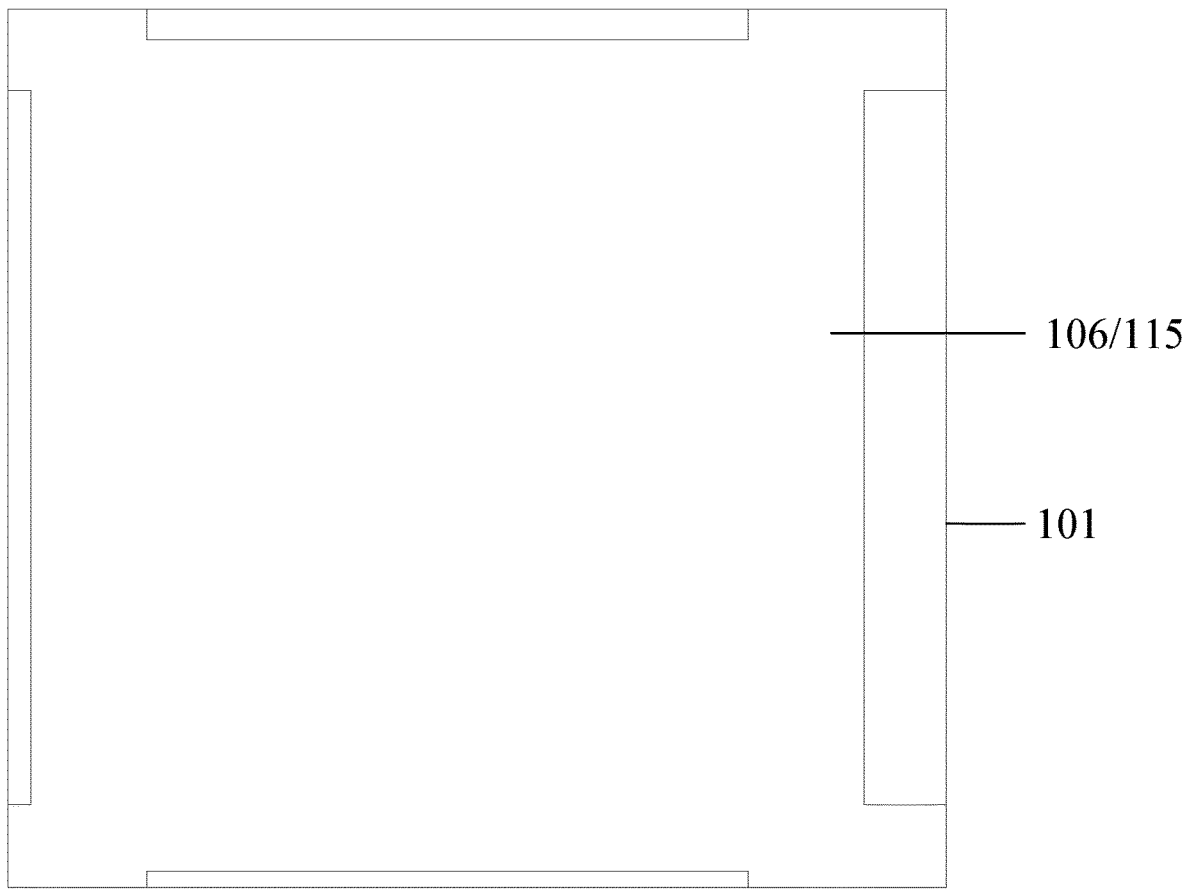
FIG. 16 is a schematic structural diagram of a transparent bias layer or an electromagnetic shielding layer in FIG. 12.
Figure 17:
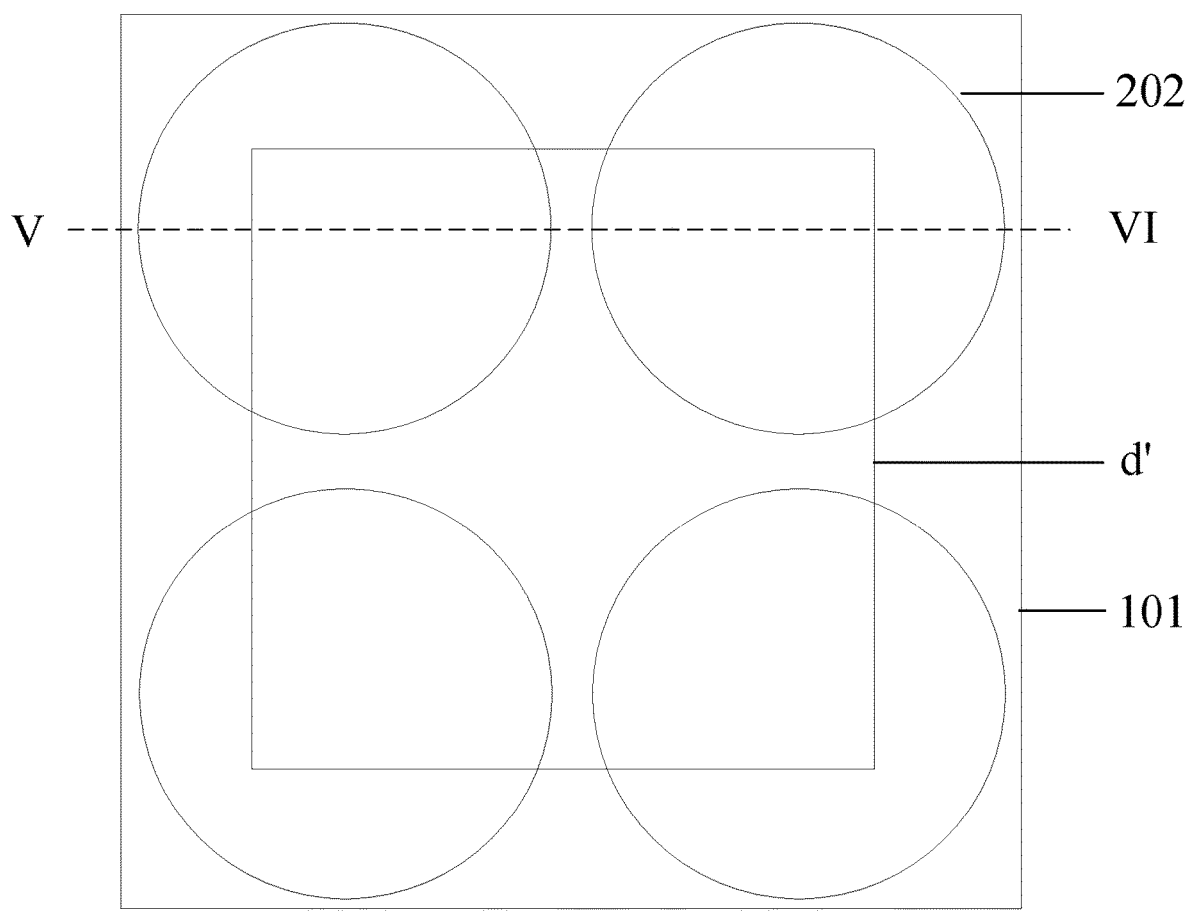
FIG. 17 is a schematic structural diagram of an area where a capacitor is located in a noise reduction area of the print recognition module provided by an embodiment of the present disclosure.

In some embodiments, in the above-mentioned print recognition module provided by embodiments of the present disclosure, as shown in FIGS. 5, 12, 14 to 16, the print recognition substrate 100 may further include a first planarization layer 104, a first insulating layer 105 and a transparent bias layer 106. Here, the first planarization layer 104, the first insulating layer 105 and the transparent bias layer 106 are located in sequence on a side, of a layer where the plurality of photosensitive devices 102 are located, facing away from the base substrate 101. To facilitate the loading of bias voltage on the second electrode 123, the first planarization layer 104 may include a plurality of first via holes d. The first via holes d are arranged in one-to-one correspondence with the second electrodes 123. An orthographic projection of the first via hole d on the base substrate 101 is located in an orthographic projection of the second electrode 123 corresponding to the first via hole on the base substrate 101. The first insulating layer 105 includes a plurality of second via holes e, the second via holes e and the first via holes d penetrate through each other in one-to-one correspondence; and an orthographic projection of the second via hole e on the base substrate 101 is located in an orthographic projection of the first via hole d corresponding to the second via hole on the base substrate 101. The second electrode 123 is electrically connected with the transparent bias layer 106 through the first via hole d and the second via hole e penetrating through each other. In addition, as shown in FIGS. 12 and 16, the transparent bias layer 106 has patterns in the center and four corners of the pixel area where each photosensitive device 102 is located, and is hollowed out at the four sides among the four corners, so as to minimize the coupling capacitance formed between the transparent bias layer 106 and the underlying signal line, and to minimize the mutual interference between the two.

In some embodiments, in the above-mentioned print recognition module provided by embodiments of the present disclosure, as shown in FIGS. 14 and 15, the orthographic projection of the first via hole d on the photoelectric conversion layer 122, and the orthographic projection of the second via hole e on the photoelectric conversion layer 122 are both located in a central area of the photoelectric conversion layer 122. The orthographic projection of the center $O_4$ of the first via hole d on the photoelectric conversion layer 122, and the orthographic projection of the center $O_5$ of the second via hole e on the photoelectric conversion layer 122 both substantially coincide with the center O of the photoelectric conversion layer 122, that is, they may coincide exactly, or they may be within the allowable error range.

In some embodiments, in the above-mentioned print recognition module provided by embodiments of the present disclosure, as shown in FIGS. 1, 2, 15, 17 and 18, the print recognition substrate 100 includes a print recognition area AA, and a noise reduction area BB located on at least one side of the print recognition area AA; the plurality of photosensitive devices 102, the light-transmitting holes (including the first light-transmitting hole a, the second light-transmitting hole b and the third light-transmitting hole c), the first via holes d and the second via holes e are located in the print recognition area AA, and the plurality of microlenses 202 are located in the print recognition area AA and the noise reduction area BB; the print recognition substrate 100 further includes a capacitor 107 located in the noise reduction area BB, and the capacitor 107 includes a first electrode plate 171 and a second electrode plate 172 that are opposite to each other. The first electrode plate 171 and the first electrode 121 are arranged in the same layer and made of the same material, the second electrode plate 172 and the second electrode 123 are arranged in the same layer and made of the same material. The first planarization layer 104 further includes a third via hole(s) d' located in the noise reduction area BB, and an orthographic projection of the third via hole d' on the base substrate 101 is located in an orthographic projection of the first electrode plate 171 on the base substrate 101. The third via holes d' are filled with the first insulating layer 105, so that the first electrode plate 171 and the second electrode plate 172 are insulated from each other. The area of one third via hole d' is approximately the same as a sum of areas of all the first via holes d (for example, the four first via holes d shown in FIG. 15) in an area where one of the plurality of photosensitive devices is located, so that a capacitance value of each photosensitive device 102 in the print recognition area AA is the same as a capacitance value of an area where each capacitor 107 is located in the noise reduction area BB. Thereby, the capacitor 107 can be used to reduce noise on the photosensitive device 102, improving the accuracy of fingerprint recognition.

Figure 18:
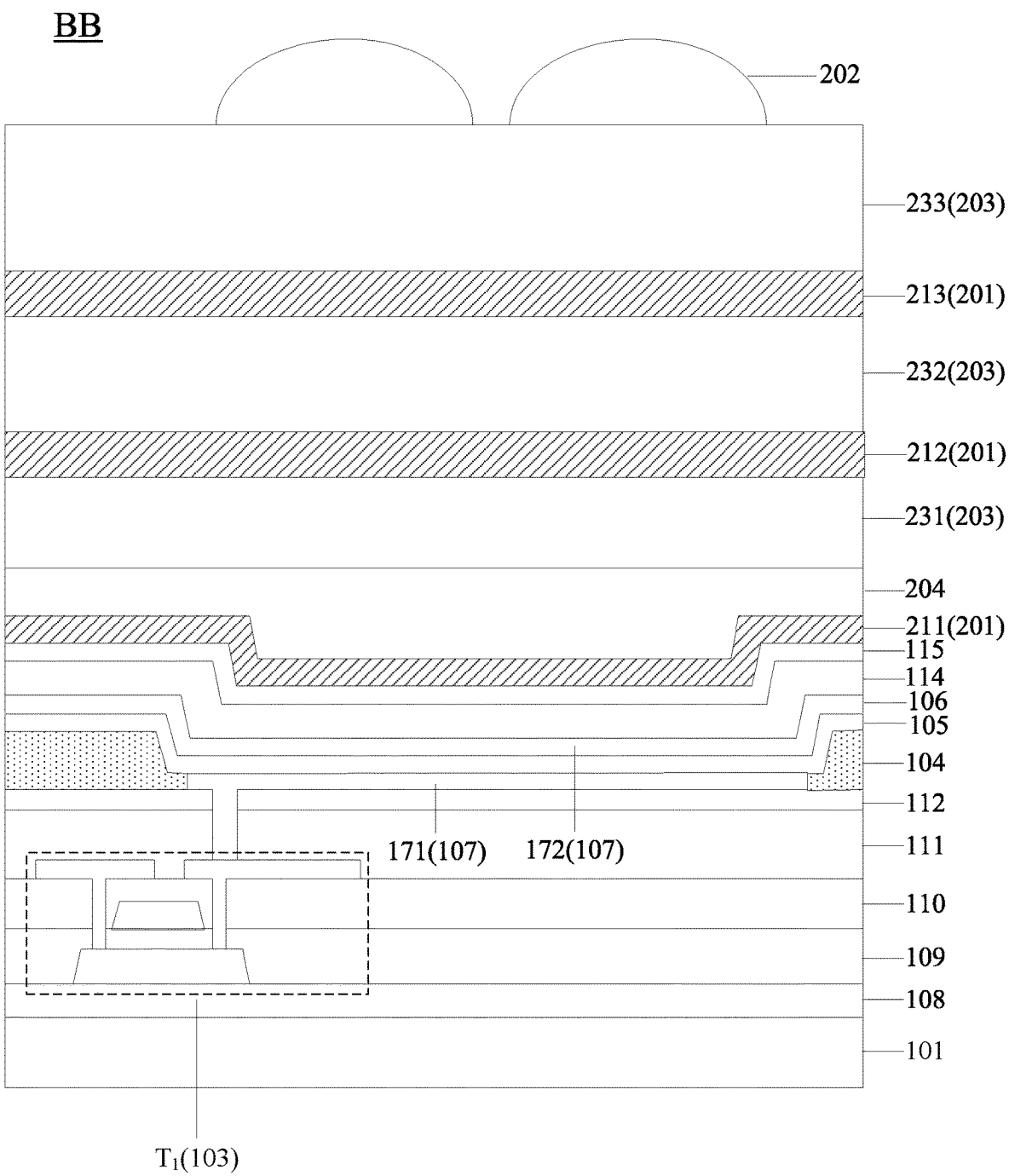
FIG. 18 is a cross-sectional view along line V-VI in FIG. 17.
Figure 19:
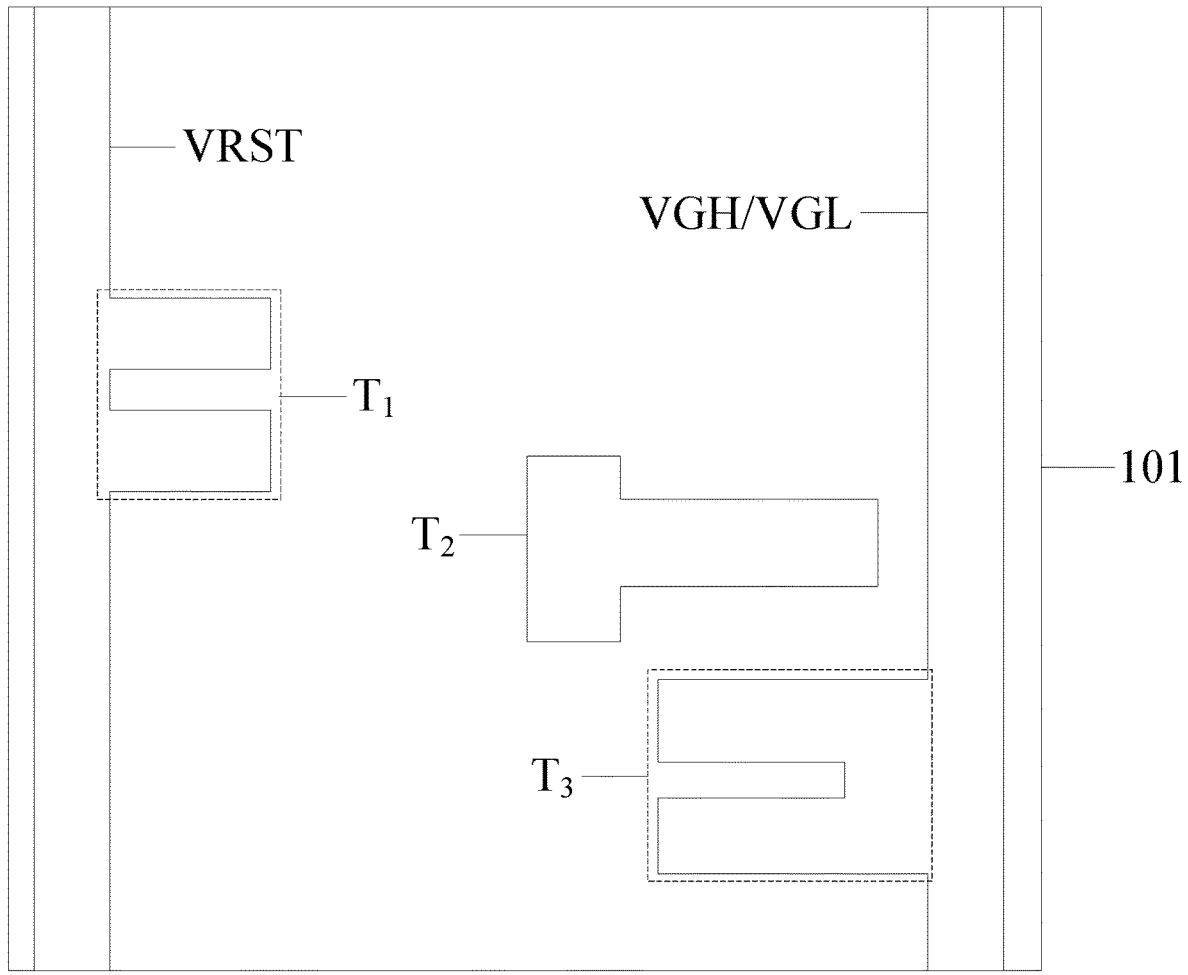
FIG. 19 is a schematic structural diagram of a gate metal layer in FIG. 12.
Figure 20:
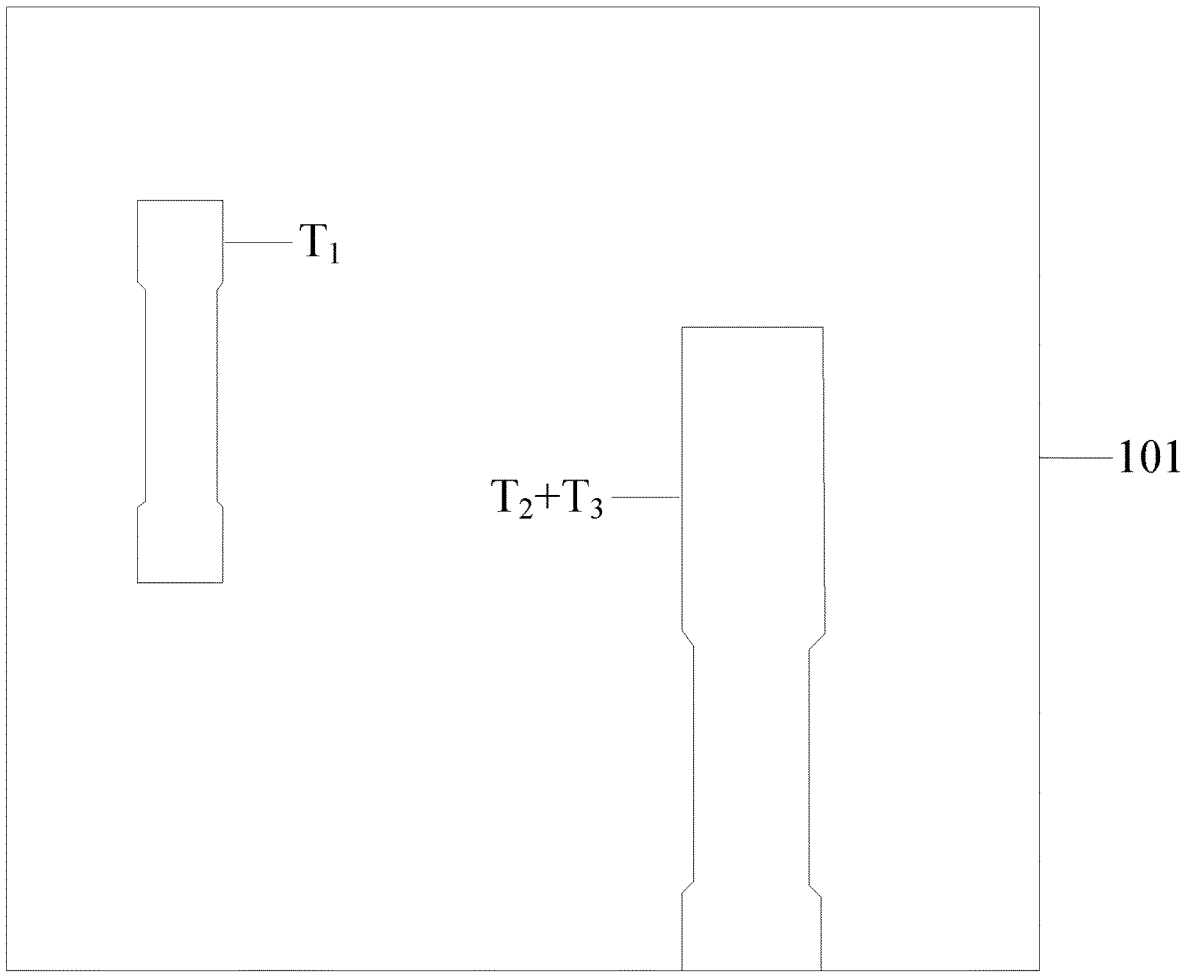
FIG. 20 is a schematic structural diagram of an active layer in FIG. 12.
Figure 21:
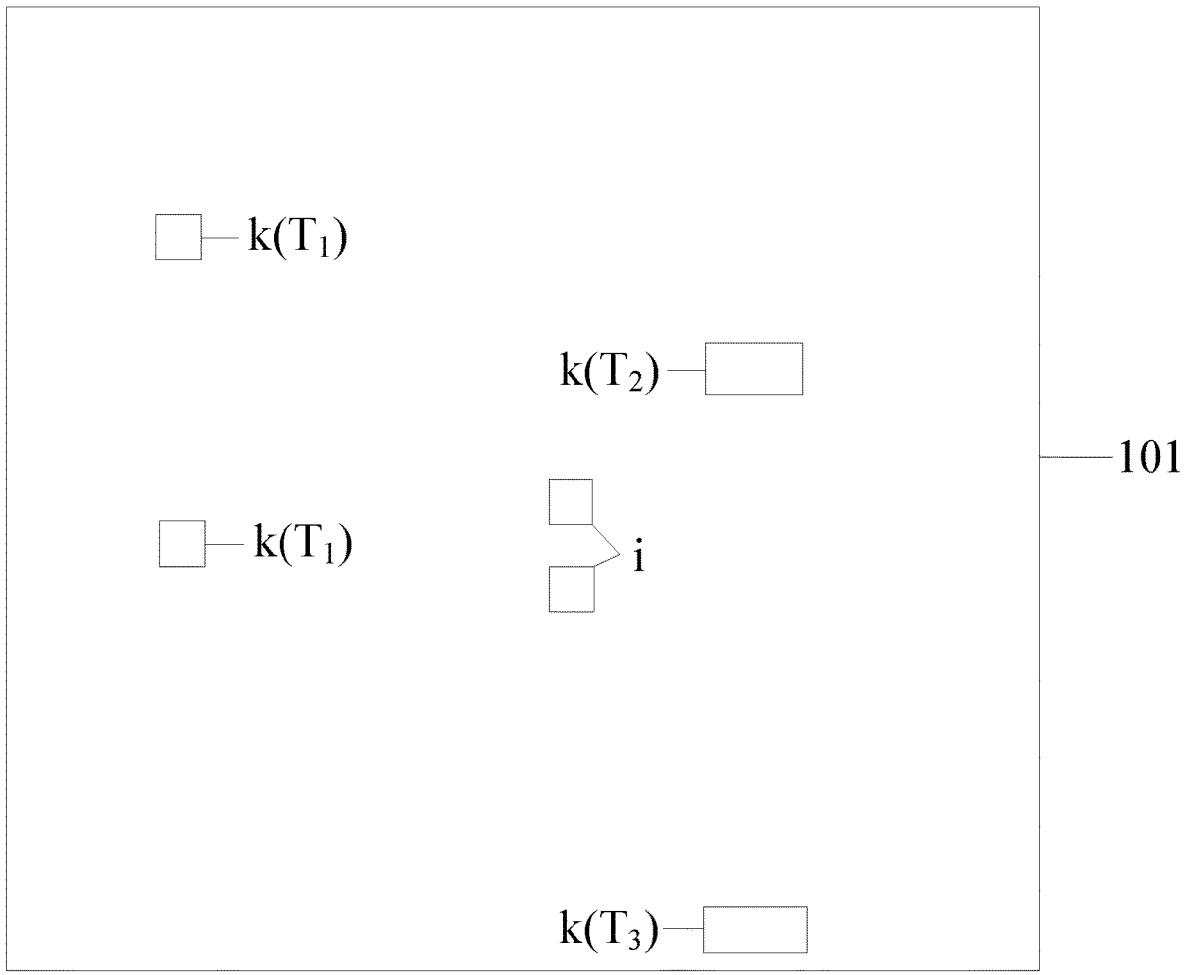
FIG. 21 is a schematic structural diagram of a gate insulating layer and an interlayer dielectric layer in FIG. 12.
Figure 22:
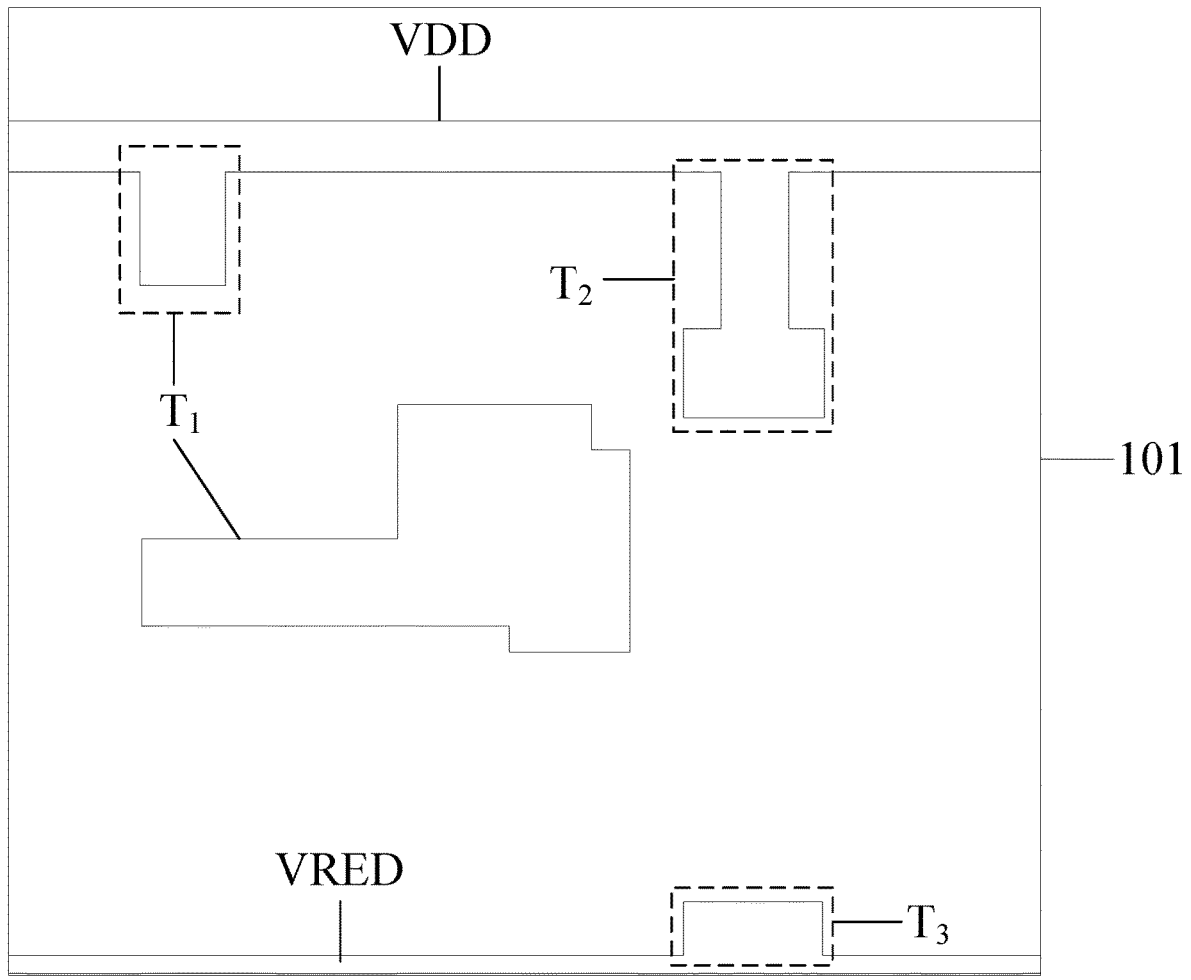
FIG. 22 is a schematic structural diagram of source and drain metal layers in FIG. 12.
Figure 23:
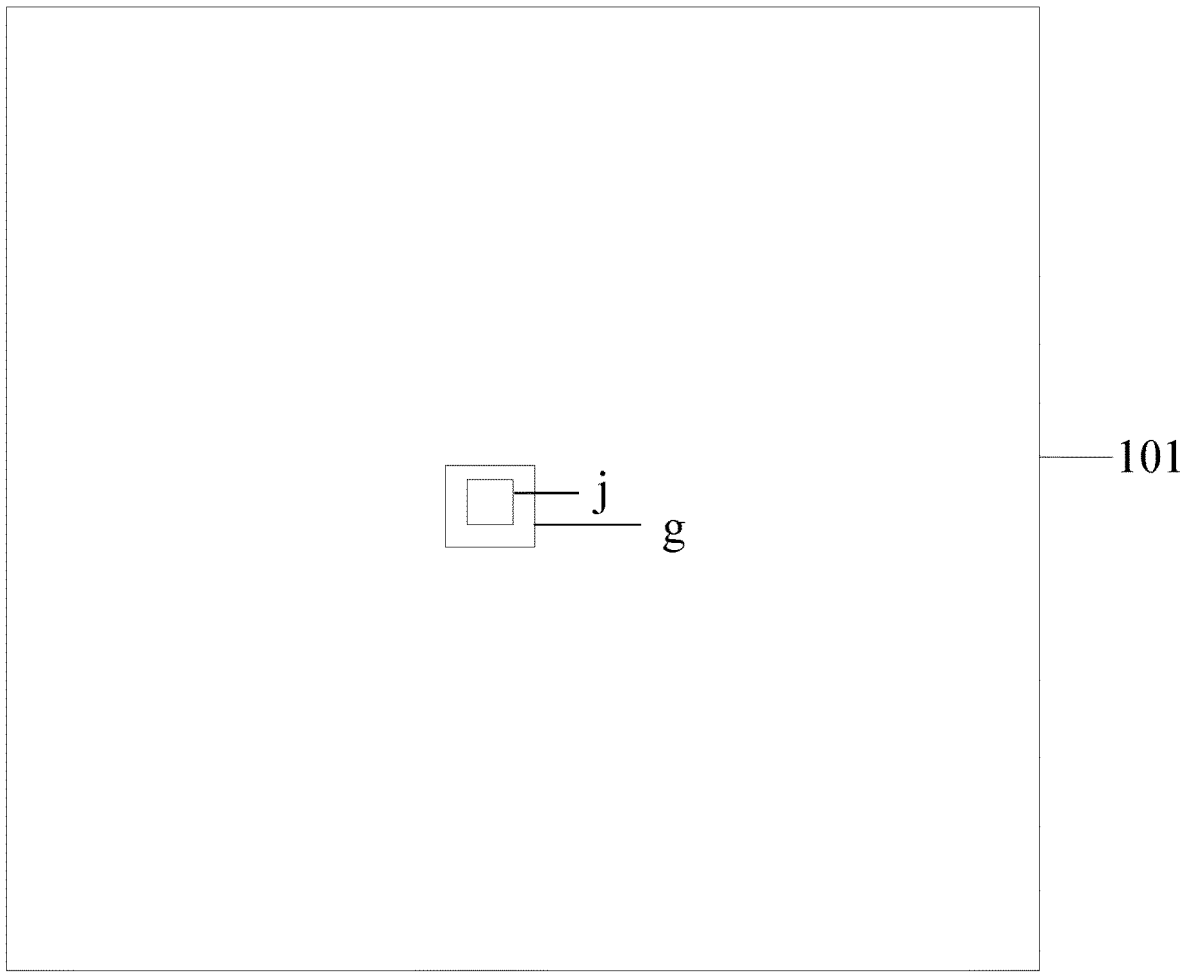
FIG. 23 is a schematic structural diagram of a second planarization layer and a second insulating layer in FIG. 12.
Figure 24:
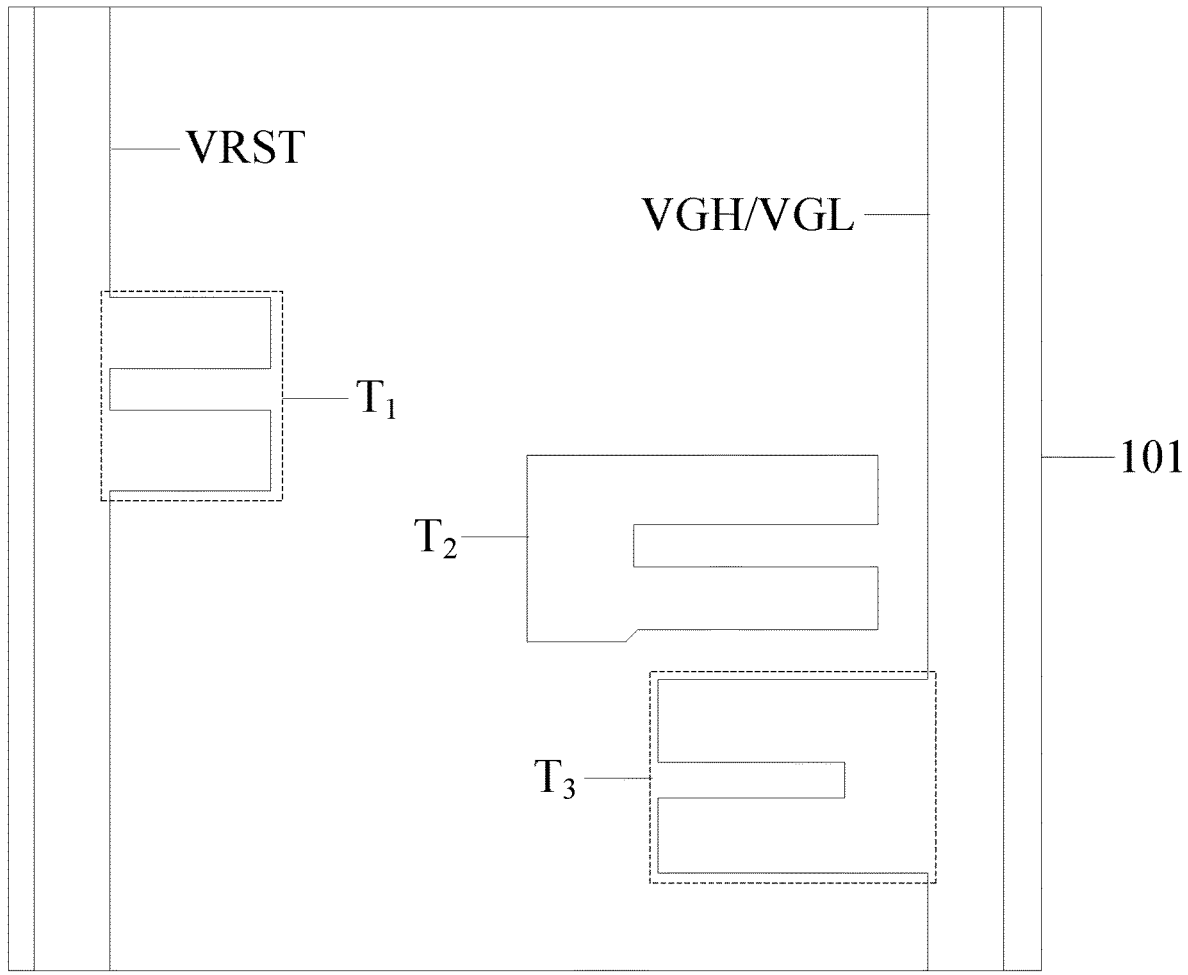
FIG. 24 is another schematic structural diagram of a gate metal layer provided by an embodiment of the present disclosure.

It should be noted that, in order to ensure the controllability of the process manufacturing, in the present disclosure, the diaphragm layers 201, the support layers 203, the micro lenses 202, and the green resin layer 204 are further prepared in the noise reduction area BB, but no via hole is set in the diaphragm layers 201, as shown in FIG. 18.

In some embodiments, in the above-mentioned print recognition module provided by embodiments of the present disclosure, as shown in FIGS. 19 to 25, the pixel driving circuit 103 may include: a reset transistor $T_1$, an amplification transistor $T_2$ and a read transistor $T_3$, where, at least one of the reset transistor $T_1$, the amplification transistor $T_2$ and the read transistor $T_3$ is a double-gate transistor, to reduce noise.

Figure 26:
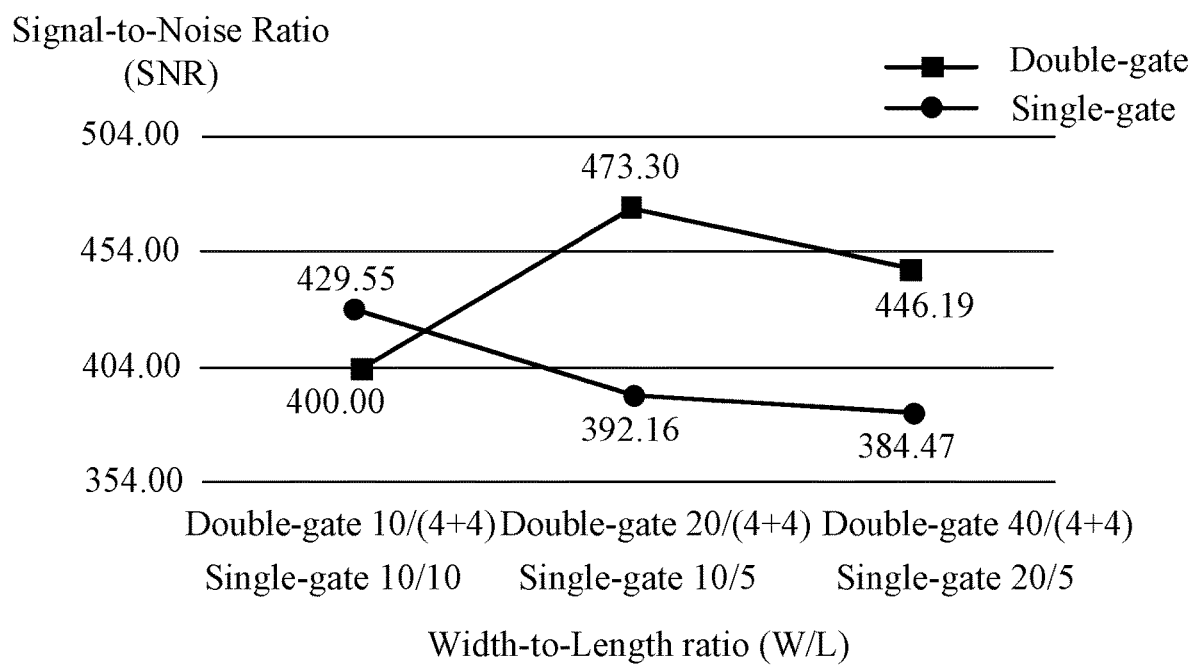
FIG. 26 is a comparison chart of signal-to-noise ratios of an amplification transistor under single-gate and double-gate provided by an embodiment of the present disclosure.

FIG. 26 shows signal-to-noise ratios (SNR) on the basis that the reset transistor $T_1$ and the read transistor $T_3$ both adopt double-gate, the amplification transistor $T_2$ respectively adopts single-gate (the polyline marked by the dots in the figure) or double-gate (the polyline marked by the squares in the figure). As shown in FIG. 26, when the amplification transistor $T_2$ adopts double-gate, most of the values of the signal-to-noise ratio are higher than the signal-to-noise ratio when the amplification transistor $T_2$ adopts single-gate. Therefore, compared with the single-gate structure, the amplification transistor $T_2$ of the double-gate structure can make fingerprint recognition more accurate as a whole.

Continuing to refer to FIGS. 5, and 19 to 25, in the pixel driving circuit 103, the gate of the reset transistor $T_1$ is electrically connected with the first signal line VRST, and the first electrode of the reset transistor $T_1$ is electrically connected with the first electrode 121 through the fourth via hole g (penetrating the second planarization layer 111) and the fifth via hole j (penetrating the second insulating layer 112) penetrating through each other; and the first electrode of the reset transistor $T_1$ is further electrically connected with the gate of the amplification transistor $T_2$ through the sixth via hole i (penetrating the interlayer dielectric layer 110). The second electrode of the reset transistor $T_1$ is electrically connected with the power line VDD; the first electrode of the amplification transistor $T_2$ is electrically connected with the second electrode of the read transistor $T_3$, and the second electrode of the amplification transistor $T_2$ is electrically connected with the power line VDD. The gate of the read transistor $T_3$ is electrically connected with the second signal line VGH/VGL, and the first electrode of the read transistor $T_3$ is electrically connected with the third signal line VRED; the storage capacitor C is set in parallel with the photosensitive device 102. The active layer of each transistor is electrically connected with the first electrode and the second electrode through the corresponding seventh via hole k (penetrating the gate insulating layer 109 and the interlayer dielectric layer 110). In some embodiments, the first electrode of the amplification transistor $T_2$ and the second electrode of the read transistor $T_3$ may be made of conductive active layer material.

It should be noted that each of the above-mentioned transistors may be a top-gate transistor or a bottom-gate transistor, which is not limited here. In some embodiments, the transistor may be a low-temperature polysilicon transistor to obtain larger carrier mobility, which is beneficial to achieving high frame rate imaging in glass-based optical detection. In some other embodiments, the transistor may also be an amorphous silicon transistor, an oxide transistor, a field effect transistor, etc. In addition, the first electrode and second electrode of the transistor are the drain electrode and the source electrode respectively. Depending on the transistor type and the input signal, their functions can be interchanged, and no specific distinction will be made here. Generally, when the transistor is a P-type transistor, the first electrode of the transistor is the source electrode and the second electrode of the transistor is the drain electrode; and when the transistor is an N-type transistor, the first electrode of the transistor is the drain electrode and the second electrode of the transistor is the source electrode.

Figure 25:
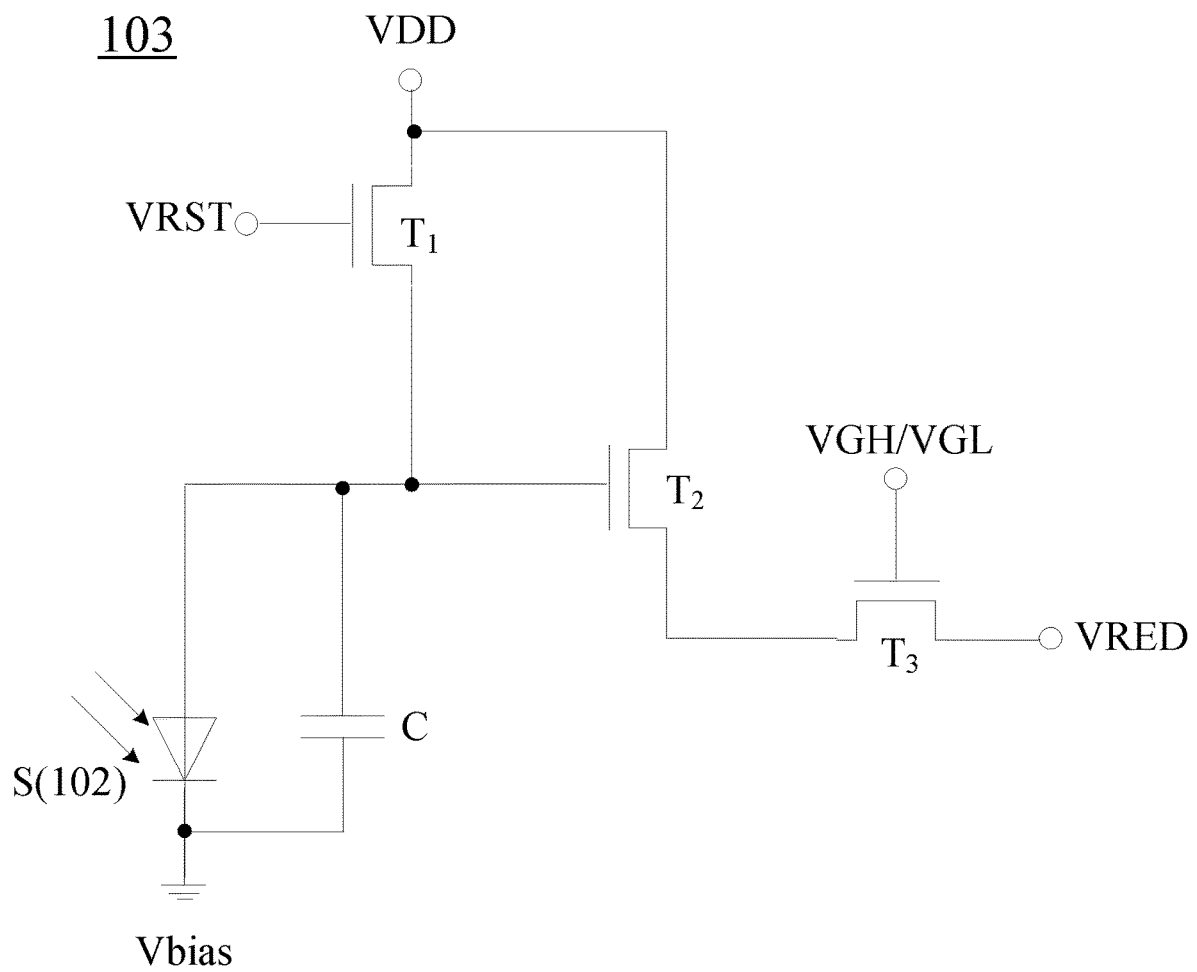
FIG. 25 is a schematic structural diagram of a pixel driving circuit included in FIG. 12.

In specific implementations, in FIG. 25, the reset transistor $T_1$ controls the gate potential of the amplification transistor $T_2$ to be reset, the amplification transistor $T_2$ amplifies the current signal output by the photosensitive device 102, and the read transistor $T_3$ provides the amplified current signal to the third signal line VRED. In some embodiments, the power line VDD is connected with a DC potential of about +5V, and the bias voltage $V_{bias}$ provided by the transparent bias layer 106 is connected with a DC potential of about 0V, which can put the photosensitive device 102 in a reverse biased state. The specific working process of the pixel driving circuit 103 shown in FIG. 25 is as follows: first, the reset transistor $T_1$ is turned on under the control of the square wave signal provided by the first signal line VRST, so that the gate potential of the amplification transistor $T_2$ is reset to a fixed potential signal provided by the power line VDD, and the amplification transistor $T_2$ works in a saturated state; then, the photosensitive device 102 enters the exposure stage, and the photosensitive device 102 is reverse-biased to generate a photocurrent signal; finally, the read transistor $T_3$ is turned on under the control of the square wave signal provided by the second signal line VGH/VGL; and the external read chip (ROIC) reads the gate potential change of the amplification transistor $T_2$ through the third signal line VRED (equivalent to the current signal on the amplification transistor $T_2$ and read transistor $T_3$ paths).

In addition, FIG. 5 only schematically shows that the slopes of the first via hole d and the second via hole e are in a broken line shape. In some embodiments, the slopes of the first via hole d and the second via hole e can both be smooth curved shapes, and specific limitations are not made here.

Figure 27:
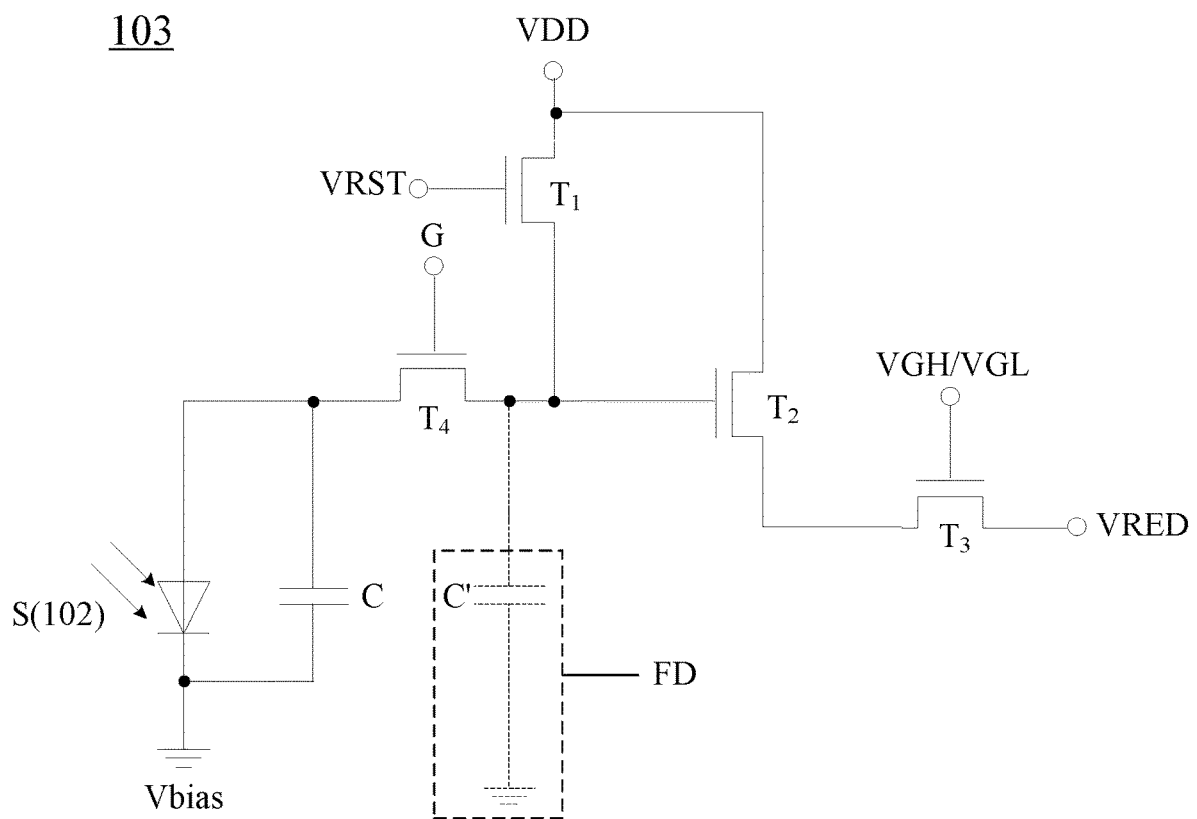
FIG. 27 is another schematic structural diagram of a pixel driving circuit provided by an embodiment of the present disclosure.
Figure 28:
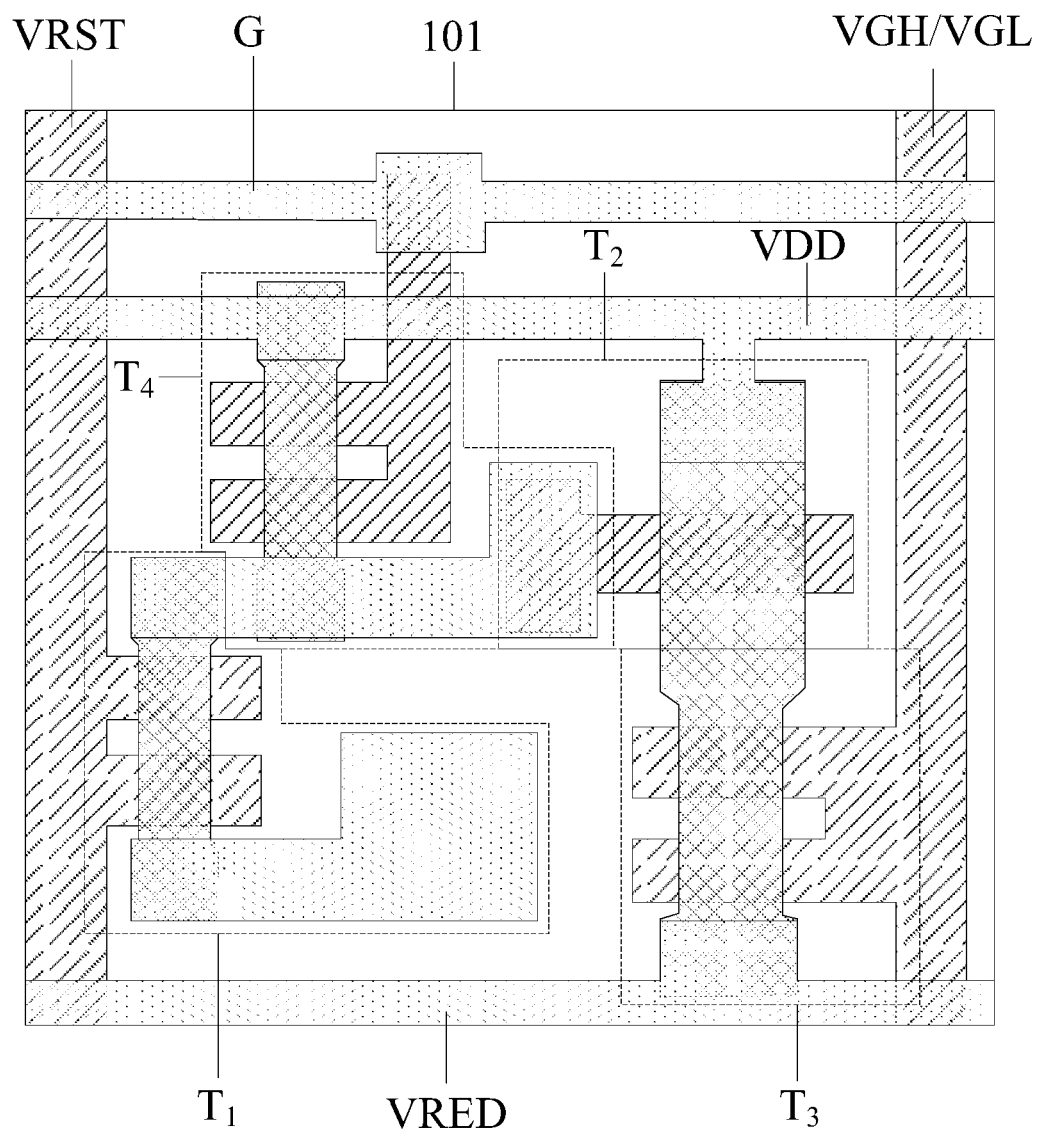
FIG. 28 is a design layout of the pixel driving circuit shown in FIG. 27.

In some embodiments, in the above-mentioned print recognition module provided by embodiments of the present disclosure, as shown in FIG. 27 and FIG. 28, the pixel driving circuit 103 may further include a noise reduction transistor $T_4$. The noise reduction transistor $T_4$ is a single-gate transistor or double-gate transistor.

The pixel driving circuit 103 shown in FIG. 25 has a simple structure and a high fill factor. Since there is no storage node in the pixel driving circuit 103 shown in FIG. 25, true correlated double sampling cannot be realized. In some embodiments, the pixel driving circuit 103 shown in FIG. 25 usually uses pseudo-correlated double sampling to eliminate fixed pattern noise, but cannot eliminate time-related noise (kT/C). Compared with the pixel driving circuit 103 shown in FIG. 25, the pixel driving circuit 103 shown in FIGS. 27 and 28 adds a noise reduction transistor $T_4$ and a charge storage node, i.e., a floating diffusion point FD, that is, the capacitance C' shown by the dotted line. The gate of the noise reduction transistor $T_4$ is electrically connected with the third signal line G, the first electrode of the noise reduction transistor $T_4$ is electrically connected with the gate of the second transistor $T_2$, and the second electrode of the noise reduction transistor $T_4$ is electrically connected with the first electrode 121 of the photosensitive device 102. Therefore, the pixel driving circuit 103 shown in FIG. 27 and FIG. 28 can realize true correlated double sampling, eliminate FPN noise in the pixels, and have a low noise level.

Figure 2:
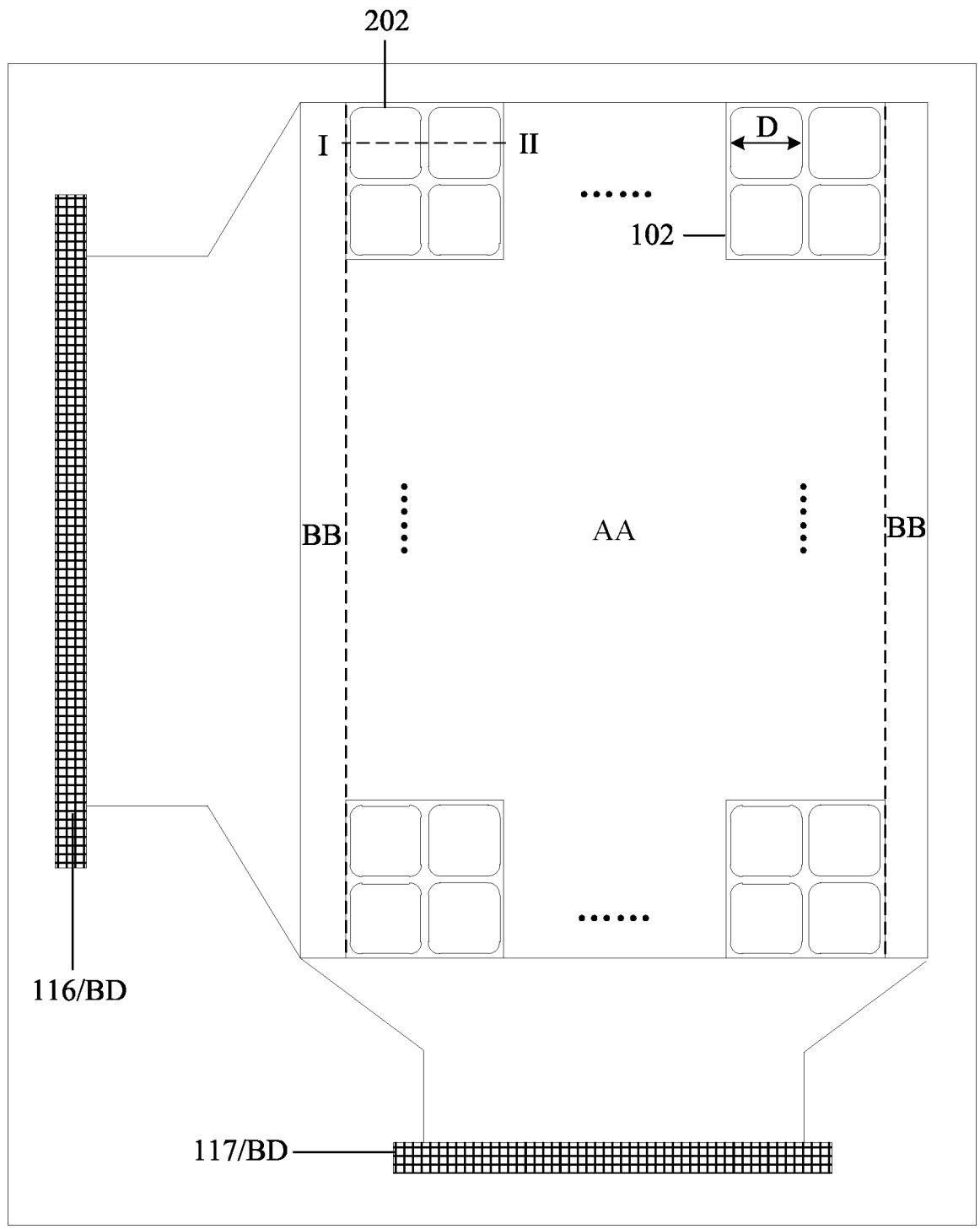
FIG. 2 is another schematic structural diagram of a print recognition module provided by an embodiment of the present disclosure.
Figure 3:
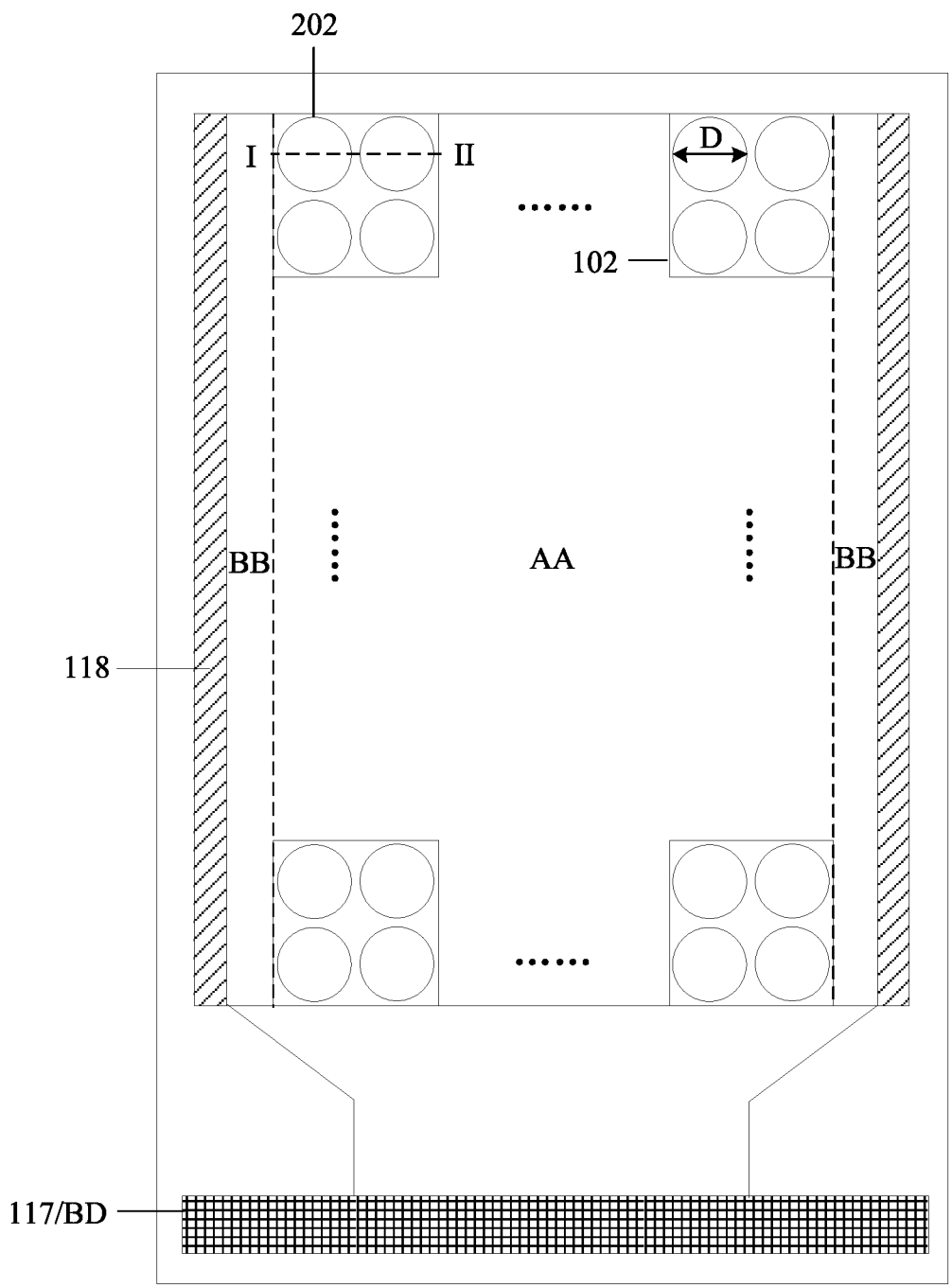
FIG. 3 is another schematic structural diagram of a print recognition module provided by an embodiment of the present disclosure.
Figure 4:
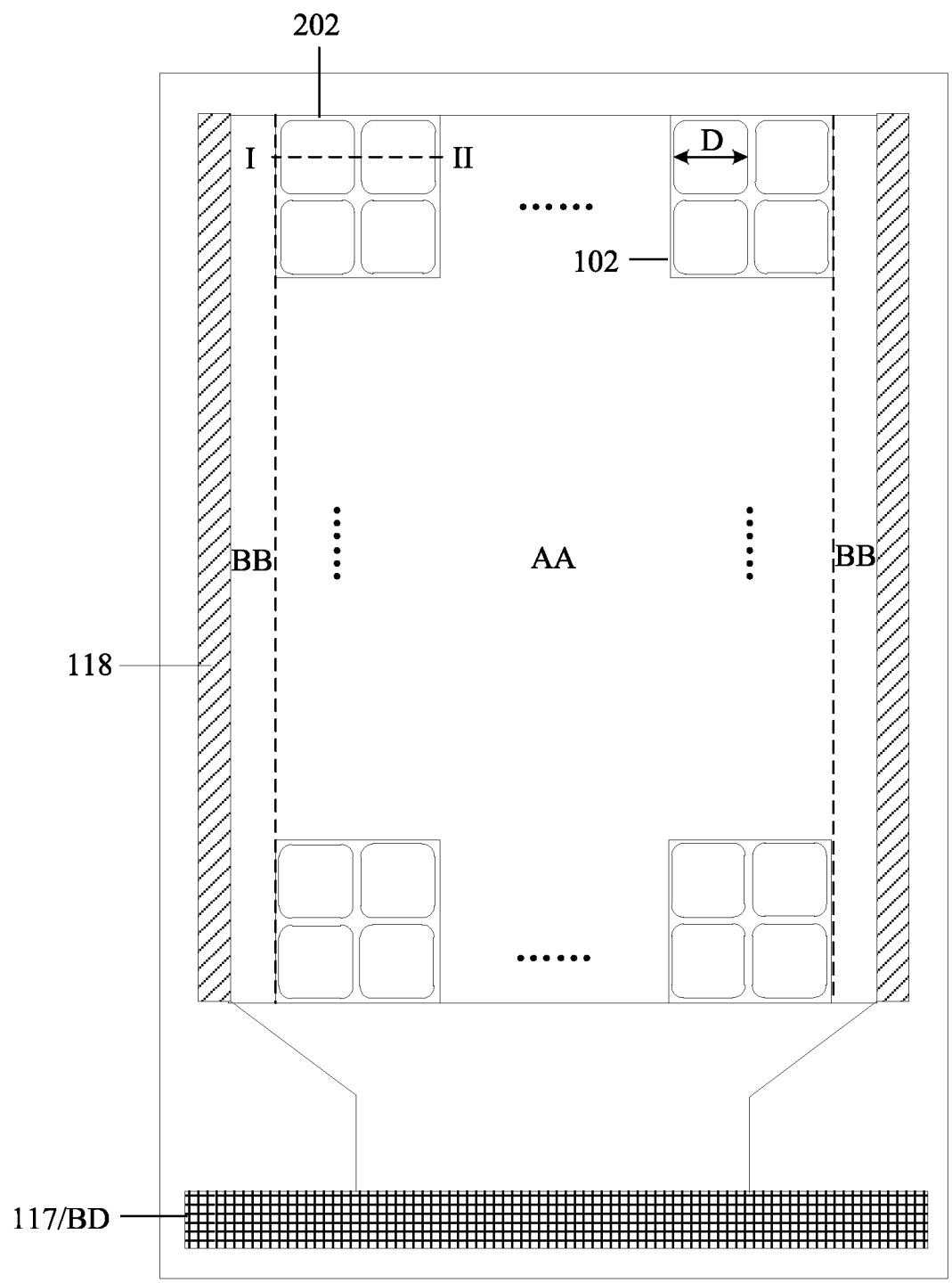
FIG. 4 is another schematic structural diagram of a print recognition module provided by an embodiment of the present disclosure.

In some embodiments, in the above-mentioned print recognition module provided by embodiments of the present disclosure, as shown in FIG. 5 and FIG. 18, the print recognition substrate 100 may further include: a buffer layer 108, a gate insulating layer 109, an interlayer dielectric layer 110, a second planarization layer 111, a second insulating layer 112, a protective layer 113, a barrier layer 114 and an electromagnetic shielding layer 115. In addition, as shown in FIGS. 1 and 2, a gate driving chip (Gate IC) 116 and a source driving chip (Source IC) 117 can also be provided in the binding area BD of the print recognition substrate 100. Here, the gate driving chip 116 is electrically connected with the first signal line VRST and the second signal line VGH/VGL, and the source driving chip 117 is electrically connected with the third signal line RED, the power line VDD, and the fourth signal line G. In some embodiments, as shown in FIGS. 3 and 4, a gate driving circuit (GOA) 118 can be arranged on the side of the noise reduction area BB facing away from the print recognition area AA, and the gate driving circuit 118 is configured to provide driving signals to the first signal line VRST and the second signal line VGH/VGL, thereby eliminating the need to bond the gate driving chip 116 and achieving the technical effect of narrow borders. The other essential components of the print recognition module are all understood by those of ordinary skill in the art, and will not be described in detail here, nor should they be used to limit the present disclosure.

Figure 29:
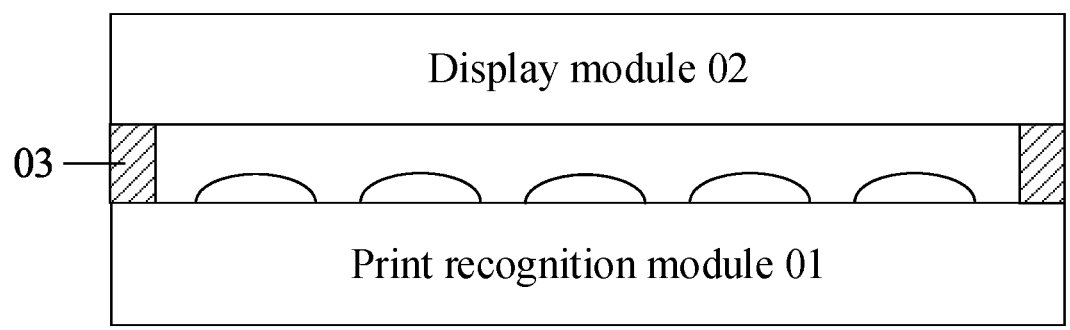
FIG. 29 is a schematic structural diagram of a display apparatus provided by an embodiment of the present disclosure.

Based on the same inventive concept, embodiments of the present disclosure provide a display apparatus, as shown in FIG. 29, including: a fingerprint recognition module O1, a display module O2 and an adhesive layer O3; where, the fingerprint recognition module O1 is the above-mentioned print recognition module provided in embodiments of the present disclosure. The fingerprint recognition module O1 is arranged on an opposite side of a display side of the display module O2; the adhesive layer O3 is arranged between the display module O2 and the fingerprint recognition module O1, an orthographic projection of the adhesive layer O3 on the display module O2 is located in a frame area of the display module O2, so that the space surrounded by the fingerprint recognition module O1, the display module O2 and the adhesive layer O3 forms an air gap, which is conducive for maintaining the unchanged propagation direction of the light path reflected by the fingers.

When fingerprint recognition is performed, when a finger touches the display module O1, the light restriction layer 200 can filter out the small-angle light reflected by the finger that is close to collimation, so that it reaches the photoelectric conversion layer 122 of the below photosensitive device 102. The photoelectric conversion layer 122 can detect the intensity of light. Due to the different energy of diffuse light reflected from the valleys and ridges, the light intensity detected by the array of the photosensitive devices 102 is different, thereby obtaining fingerprint image information.

In some embodiments, the above-mentioned display apparatus provided by the embodiments of the present disclosure may be: a mobile phone, a tablet computer, a television, a monitor, a notebook computer, a digital photo frame, a navigator, a smart watch, a fitness wristband, a personal digital assistant, or any other device with a product or component that displays functionality. The display apparatus includes but is not limited to: a radio frequency unit, network module, audio output and input unit, sensor, display unit, user input unit, interface unit, memory, processor, power supply and other components. In addition, those skilled in the art can understand that the above structures do not constitute a limitation on the above display apparatus provided by the embodiments of the present disclosure. In other words, the above display apparatus provided by the embodiments of the present disclosure may include more or less components than the above, or combinations of certain components, or different of components arrangements may be included.

Evidently, those skilled in the art can make various modifications and variations to the present disclosure without departing from the spirit and scope of the present disclosure. Thus the present disclosure is also intended to encompass these modifications and variations therein as long as these modifications and variations to the present disclosure fall within the scope of the claims of the present disclosure and their equivalents.

What is claimed is:

1. A print recognition module, comprising:
a print recognition substrate, wherein the print recognition substrate comprises a base substrate and a plurality of photosensitive devices arranged in an array on a side of the base substrate;
a light restriction layer, arranged in direct contact with a side of the print recognition substrate providing with the plurality of photosensitive devices; wherein the light restriction layer comprises at least one diaphragm layer, and a micro-lens layer on a side of the diaphragm layer facing away from the print recognition substrate;
wherein the diaphragm layer comprises light-transmitting holes arranged in an array;
orthographic projections of the light-transmitting holes on the base substrate are located in orthographic projections of the photosensitive devices on the base substrate;
the micro-lens layer comprises a plurality of micro-lenses arranged at intervals; and
orthographic projections of the micro-lenses on the base substrate cover and are larger than the orthographic projections of the light-transmitting holes on the base substrate;
wherein the light restriction layer comprises at least two diaphragm layers;
the light-transmitting holes in each of the diaphragm layers correspond to each other one-to-one; and orthographic projections of the light-transmitting holes in each of the diaphragm layers on the base substrate are at least partially overlapped with each other;
wherein in a direction facing away from the print recognition substrate, the diaphragm layers comprise a first diaphragm layer, a second diaphragm layer and a third diaphragm layer arranged in sequence;
the first diaphragm layer comprises first light-transmitting holes arranged in an array, the second diaphragm layer comprises second light-transmitting holes arranged in an array, and the third diaphragm layer comprises third light-transmitting holes arranged in an array;
orthographic projections of the second light-transmitting holes on the base substrate cover and are larger than orthographic projections of the first light-transmitting holes on the base substrate; and
the orthographic projections of the second light-transmitting holes on the base substrate are located in orthographic projections of the third light-transmitting holes on the base substrate;
wherein the micro-lenses are arranged in one-to-one correspondence with the light-transmitting holes, and each micro-lens comprises a convex surface and a flat surface; the convex surface is arranged at a side of the flat surface facing away from the light-transmitting hole;
wherein the light restriction layer further comprises a plurality of support layers alternately arranged with the diaphragm layers;
the aperture $D_1$ of the first light-transmitting hole satisfies a following relationship:

$$D_1 = [D^2/(2h_s) + h_s] * [n_x/(n-1)] * \tan\theta;$$

wherein, D represents an aperture of the micro-lens, $h_s$ represents a height of the micro-lens, n represents a refractive index of the micro-lens, $n_x$ represents a refractive index of at least one of the plurality of support layers, and θ represents a light receiving angle.

2. The print recognition module according to claim 1, wherein between an orthographic projection of a center of the first light-transmitting hole on the base substrate and an orthographic projection of a center of the second light-transmitting hole corresponding the first light-transmitting hole on the base substrate is provided with a first distance;
between the orthographic projection of the center of the first light-transmitting hole on the base substrate and an orthographic projection of a center of the third light-transmitting hole corresponding the first light-transmitting hole on the base substrate is provided with a second distance;
a ratio of the first distance to an aperture of the first light-transmitting hole is greater than or equal to 0 and less than or equal to 20%; and
a ratio of the second distance to the aperture of the first light-transmitting hole is greater than or equal to 0 and less than or equal to 20%.

3. The print recognition module according to claim 1, wherein an aperture $D_2$ of the second light-transmitting hole satisfies a following relationship:

$$D_2 = k * D_1,$$
$$D_2 < D_3;$$

wherein, 1<k<2, $D_1$ represents an aperture of the first light-transmitting hole, and $D_3$ represents an aperture of the third light-transmitting hole.

4. The print recognition module according to claim 1, wherein the plurality of support layers comprise a first support layer, a second support layer and a third support layer; wherein,
the first support layer is arranged between the first diaphragm layer and the second diaphragm layer;
the second support layer is arranged between the second diaphragm layer and the third diaphragm layer; and
the third support layer is arranged on a side of the third diaphragm layer facing away from the second diaphragm layer.

5. The print recognition module according to claim 4, wherein an aperture $D_3$ of the third light-transmitting hole satisfies a following relationship:

$$D_3 = D * (H - H_3)/H;$$

wherein, H represents a distance between a surface of the micro-lens layer facing the print recognition substrate and a surface of the first diaphragm layer facing away from the print recognition substrate, and $H_3$ represents a thickness of the third support layer.

6. The print recognition module according to claim 5, wherein a thickness of the second diaphragm layer is substantially the same as a thickness of the third diaphragm layer;
the distance H between the surface of the micro-lens layer facing the print recognition substrate and the surface of the first diaphragm layer facing away from the print recognition substrate satisfies a following relationship:

$$H = \{[D^2/(4h_s)] * [n_x/(n-1)]\} - \{(3n-2)*n_x*h_s/[2(n^2-n)]\};$$

$$H = H_1 + H_2 + H_3 + H_4 + 2h;$$

wherein, $H_1$ represents a thickness of the first support layer, $H_2$ represents a thickness of the second support layer, $H_4$ represents a thickness of the green resin layer, h represents a thickness of the second diaphragm layer and a thickness of the third diaphragm layer.

7. The print recognition module according to claim 6, wherein the thickness $H_1$ of the first support layer satisfies a following relationship:

$$H_1 = D_2 * (H - H_3)/D_3 - H_4;$$

wherein: $1.4 \leq n_x \leq 1.7$, $1.5 \leq n \leq 2.0$, $1° \leq \theta \leq 10°$, $2\ \mu m \leq D \leq 50\ \mu m$, $1\ \mu m \leq D_1 \leq 10\ \mu m$, $1\ \mu m < D_2 < 40\ \mu m$, $2\ \mu m \leq D_3 \leq 50\ \mu m$, $1\ \mu m \leq h_s \leq 20\ \mu m$, $1\ \mu m \leq H_1 \leq 20\ \mu m$, $1\ \mu m \leq H_2 \leq 20\ \mu m$, $1\ \mu m \leq H_3 \leq 20\ \mu m$, $0.5\ \mu m \leq H_4 \leq 3\ \mu m$, $0.5\ \mu m \leq h \leq 1.5\ \mu m$, $4.5\ \mu m \leq H \leq 100\ \mu m$.

8. The print recognition module according to claim 1, wherein a material of the support layer comprises transparent resin and/or green resin;
wherein a material of the first diaphragm layer comprises metal, and both a material of the second diaphragm layer and a material of the third diaphragm layer comprise black resin;
wherein a distance between adjacent micro-lenses is greater than 0 μm and less than or equal to 2 μm;
wherein a shape of an orthographic projection of the micro-lens on the base substrate is a rounded square, a circle, a right-angled square or a hexagon.

9. The print recognition module according to claim 1, wherein the print recognition substrate further comprises a plurality of pixel driving circuits;
a layer where the plurality of pixel driving circuits are located is arranged between a layer where the plurality of photosensitive devices are located and the base substrate; and
the plurality of pixel driving circuits and the plurality of photosensitive devices are electrically connected in a one-to-one correspondence.

10. The print recognition module according to claim 9, wherein each of the plurality of photosensitive devices comprises at least one sub-photosensitive device;
each sub-photosensitive device comprises a first electrode, a photoelectric conversion layer and a second electrode arranged in a stacked manner;
in the same one photosensitive device which comprises a plurality of sub-photosensitive devices, each first electrode is electrically connected with a corresponding pixel driving circuit, each second electrode is arranged independently of each other, and each photoelectric conversion layer is arranged independently of each other.

11. The print recognition module according to claim 10, wherein the print recognition substrate further comprises a plurality of connection electrodes, and the plurality of connection electrodes are arranged on a same layer as the first electrode;
each first electrode in the same one photosensitive device is electrically connected with the corresponding pixel driving circuit through the plurality of connection electrodes;
wherein each photosensitive device comprises four sub-photosensitive devices; and
in the same one photosensitive device, the four sub-photosensitive devices are arranged in two rows and two columns.

12. The print recognition module according to claim 11, wherein the plurality of connection electrodes comprise a plurality of first connection electrodes; wherein
four first electrodes in one of the photosensitive devices are electrically connected with the corresponding pixel driving circuit through a same first connection electrode; and
an orthographic projection of the first connection electrode on the base substrate and orthographic projections of the four first electrodes electrically connected with the first connection electrode on the base substrate overlap each other.

13. The print recognition module according to claim 12, wherein the plurality of connection electrodes further comprise a plurality of second connection electrodes;
each second connection electrode is electrically connected with two adjacent first electrodes in the same photosensitive device; and
an orthographic projection of the second connection electrode on the base substrate and orthographic projections of the two adjacent first electrodes electrically connected with the second connection electrode on the base substrate overlap each other.

14. The print recognition module according to claim 10, wherein one photoelectric conversion layer corresponds to at least one of the plurality of micro-lenses;
wherein the photoelectric conversion layers are in one-to-one correspondence with the plurality of micro-lenses; and
an orthographic projection of the photoelectric conversion layer on the base substrate is located in an orthographic projection of the micro-lens corresponding to the photoelectric conversion layer on the base substrate.

15. The print recognition module according to claim 14, wherein the micro-lenses are in one-to-one correspondence with the light-transmitting holes;
an orthographic projection of the light-transmitting hole on the base substrate is located in a central area of the orthographic projection of the photoelectric conversion layer corresponding to the light-transmitting hole on the base substrate; and
an orthographic projection of a center of the photoelectric conversion layer on the base substrate substantially coincides with an orthographic projection of a center of the light-transmitting hole on the base substrate.

16. The print recognition module according to claim 10, wherein the print recognition substrate further comprises a planarization layer, an insulating layer and a transparent bias layer;
　wherein the planarization layer, the insulating layer and the transparent bias layer are located in sequence on a side, of a layer where the plurality of photosensitive devices are located, facing away from the base substrate;
　the planarization layer comprises a plurality of first via holes, the first via holes are arranged in one-to-one correspondence with the second electrodes;
　an orthographic projection of the first via hole on the base substrate is located in an orthographic projection of the second electrode corresponding to the first via hole on the base substrate;
　the insulating layer comprises a plurality of second via holes; the second via holes and the first via holes penetrate through each other in one-to-one correspondence; and
　an orthographic projection of the second via hole on the base substrate is located in the orthographic projection of the first via hole corresponding to the second via hole on the base substrate; and
　the second electrode is electrically connected with the transparent bias layer through the first via hole and the second via hole penetrating through each other.

17. The print recognition module according to claim 16, wherein an orthographic projection of the first via hole on the photoelectric conversion layer and an orthographic projection of the second via hole on the photoelectric conversion layer are both located in a central area of the photoelectric conversion layer;
　an orthographic projection of a center of the first via hole on the photoelectric conversion layer and an orthographic projection of a center of the second via hole on the photoelectric conversion layer both substantially coincide with a center of the photoelectric conversion layer.

18. The print recognition module according to claim 16, wherein the print recognition substrate comprises a print recognition area, and a noise reduction area located on at least one side of the print recognition area;
　the plurality of photosensitive devices, the light-transmitting holes, the first via holes and the second via holes are located in the print recognition area, and the plurality of micro-lenses are located in the print recognition area and the noise reduction area;
　the print recognition substrate further comprises a capacitor located in the noise reduction area; the capacitor comprises a first electrode plate and a second electrode plate that are opposite to each other; wherein the first electrode plate and the first electrode are located on a same layer and made of a same material; and the second electrode plate and the second electrode are located on a same layer and made of a same material.

19. The print recognition module according to claim 18, wherein the planarization layer further comprises a plurality of third via holes located in the noise reduction area;
　an orthographic projection of the third via hole on the base substrate is located in an orthographic projection of the first electrode plate on the base substrate;
　the third via holes are filled with the insulating layer to insulate the first electrode plate from the second electrode plate; and
　an area of one of the plurality of third via holes is approximately the same as a sum of areas of the first via holes in an area where one of the plurality of photosensitive devices is located.

20. The print recognition module according to claim 4, wherein the light restriction layer further comprises a green resin layer, and the green resin layer is arranged between the first diaphragm layer and the first support layer;
　the green resin layer fills the first light-transmitting holes, the second support layer fills the second light-transmitting holes, and the third support layer fills the third light-transmitting holes.

* * * * *